(12) United States Patent  (10) Patent No.: US 7,774,100 B2
Aoyama                    (45) Date of Patent:    Aug. 10, 2010

(54) ROBOT CONTROL INFORMATION GENERATOR AND ROBOT

(75) Inventor: Chiaki Aoyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/156,997

(22) Filed: Jun. 6, 2008

(65) Prior Publication Data

US 2008/0249663 A1   Oct. 9, 2008

Related U.S. Application Data

(62) Division of application No. 11/524,166, filed on Sep. 20, 2006, now Pat. No. 7,407,104.

(30) Foreign Application Priority Data

Sep. 27, 2005  (JP) .............................. 2005-279179

(51) Int. Cl.
  *G05B 15/00*  (2006.01)
  *G05B 19/00*  (2006.01)
(52) U.S. Cl. ................ 700/259; 700/245; 700/253; 700/258
(58) Field of Classification Search ................ None
See application file for complete search history.

(56) References Cited

U.S. PATENT DOCUMENTS

| 4,835,450 | A | * | 5/1989 | Suzuki ................... 318/568.13 |
| 5,068,588 | A | * | 11/1991 | Kubota et al. ............... 318/640 |
| 5,237,468 | A | * | 8/1993 | Ellis ........................... 360/92.1 |
| 6,438,448 | B1 | * | 8/2002 | Manes et al. ................. 700/218 |
| 7,004,392 | B2 | | 2/2006 | Mehlberg et al. |
| 2004/0020989 | A1 | | 2/2004 | Muramatsu |

FOREIGN PATENT DOCUMENTS

| JP | 2000-254883 | 9/2000 |
| JP | 2004-001153 | 1/2004 |
| JP | 2004-090099 | 3/2004 |

\* cited by examiner

*Primary Examiner*—Khoi Tran
*Assistant Examiner*—Bhavesh V Amin
(74) *Attorney, Agent, or Firm*—Carrier, Blackman & Associates P.C.; William D. Blackman; Joseph P. Carrier

(57) ABSTRACT

A robot control information generator generates control information for operating a robot equipped with a camera and a hand to grasp an object based on a two-dimensional code on the object. The two-dimensional code includes position identifying patterns and an information pattern, the position within the two-dimensional code of each of the position-identifying patterns is specified beforehand, and the information pattern is generated by encoding of information. The robot control information generator comprises an image input unit, a pattern detection unit, a position/posture calculation unit, a decoding device, and a control information-generating unit which generates the control information based on the decoded information decoded by the decoding device and the position/posture information calculated by the position/posture calculation unit.

4 Claims, 16 Drawing Sheets

FIG.7

RULE ⟨1⟩

| (-1,-1) | (0,-1) | (1,-1) |
|---------|--------|--------|
| (-1,0)  | (0,0)  |        |

RULE ⟨2⟩

| (-1,-1) | (0,-1) | (1,-1) |
|---------|--------|--------|
| (-1,0)  | (0,0)  |        |

RULE ⟨3⟩

| (-1,-1) | (0,-1) | (1,-1) |
|---------|--------|--------|
| (-1,0)  | (0,0)  |        |

RULE ⟨4⟩

| (-1,-1) | (0,-1) | (1,-1) |
|---------|--------|--------|
| (-1,0)  | (0,0)  |        |

RULE ⟨5⟩

| (-1,-1) | (0,-1) | (1,-1) |
|---------|--------|--------|
| (-1,0)  | (0,0)  |        |

FIG.14
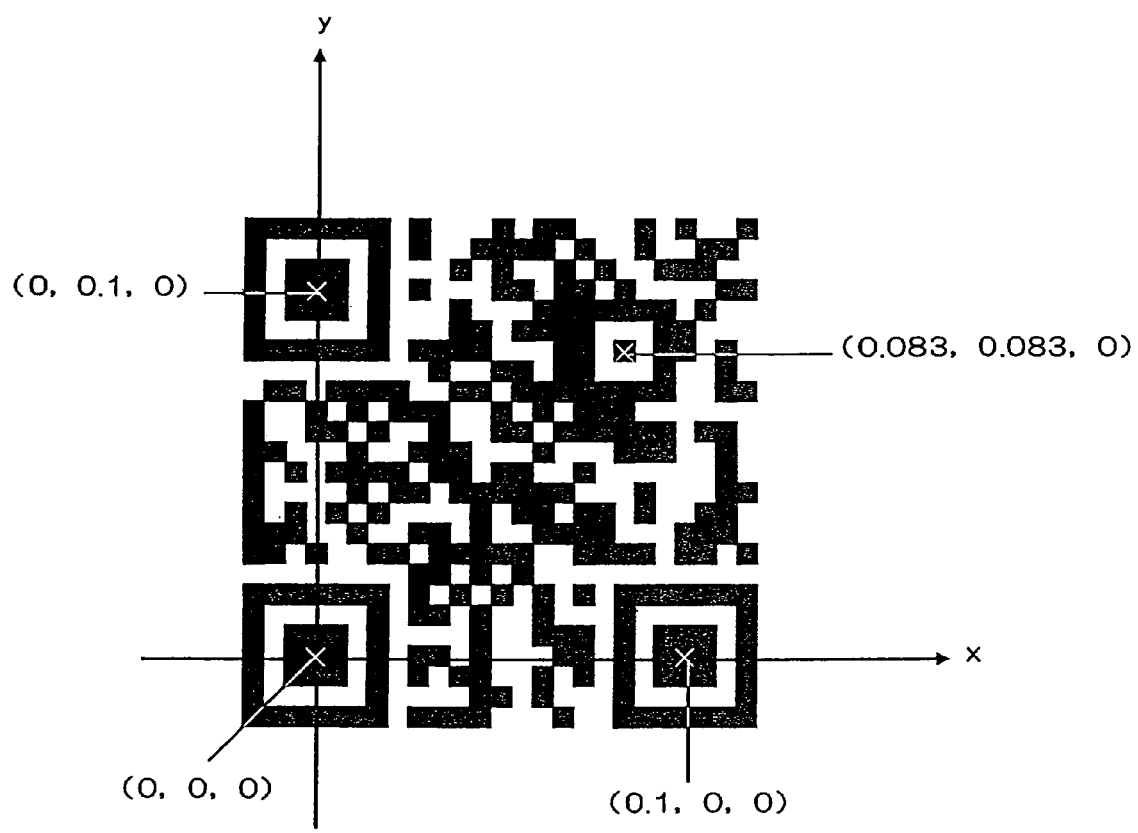
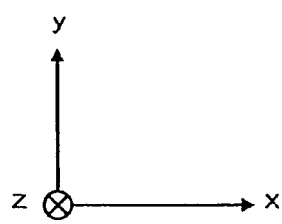

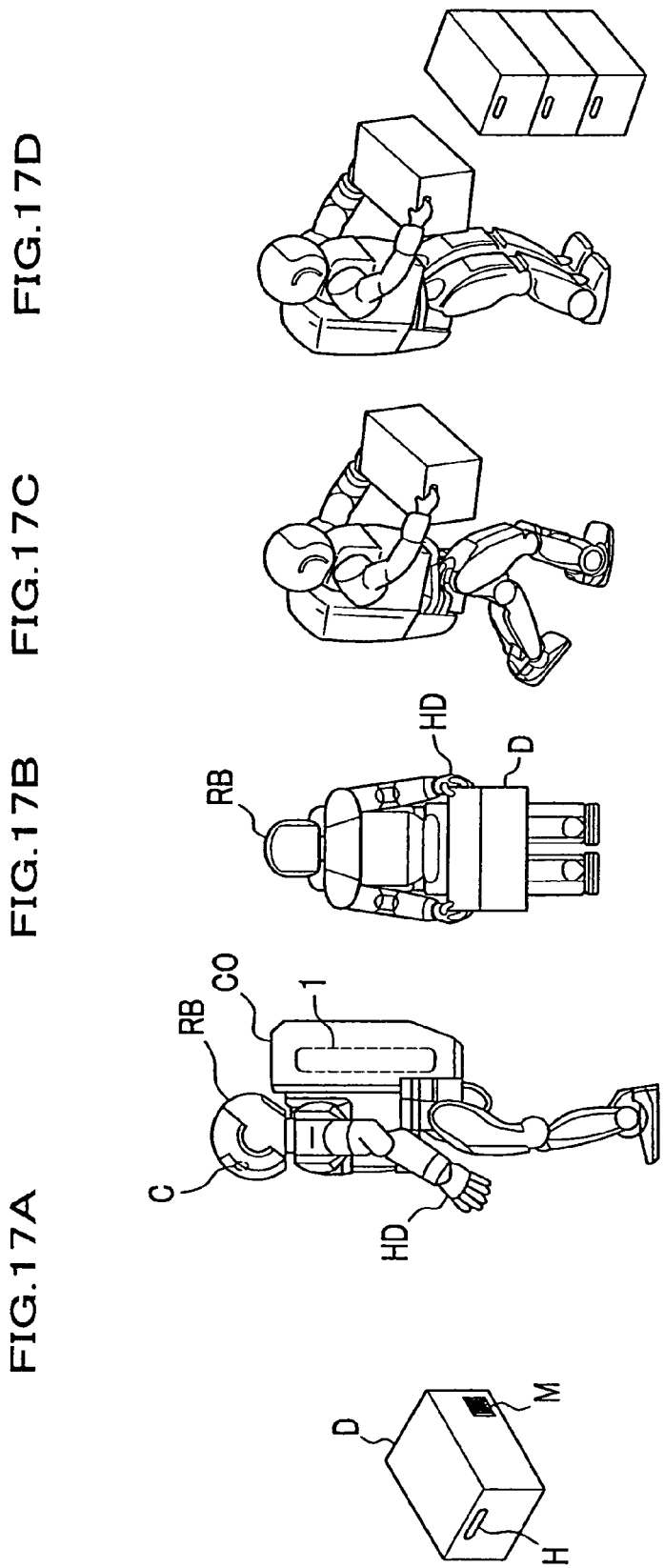

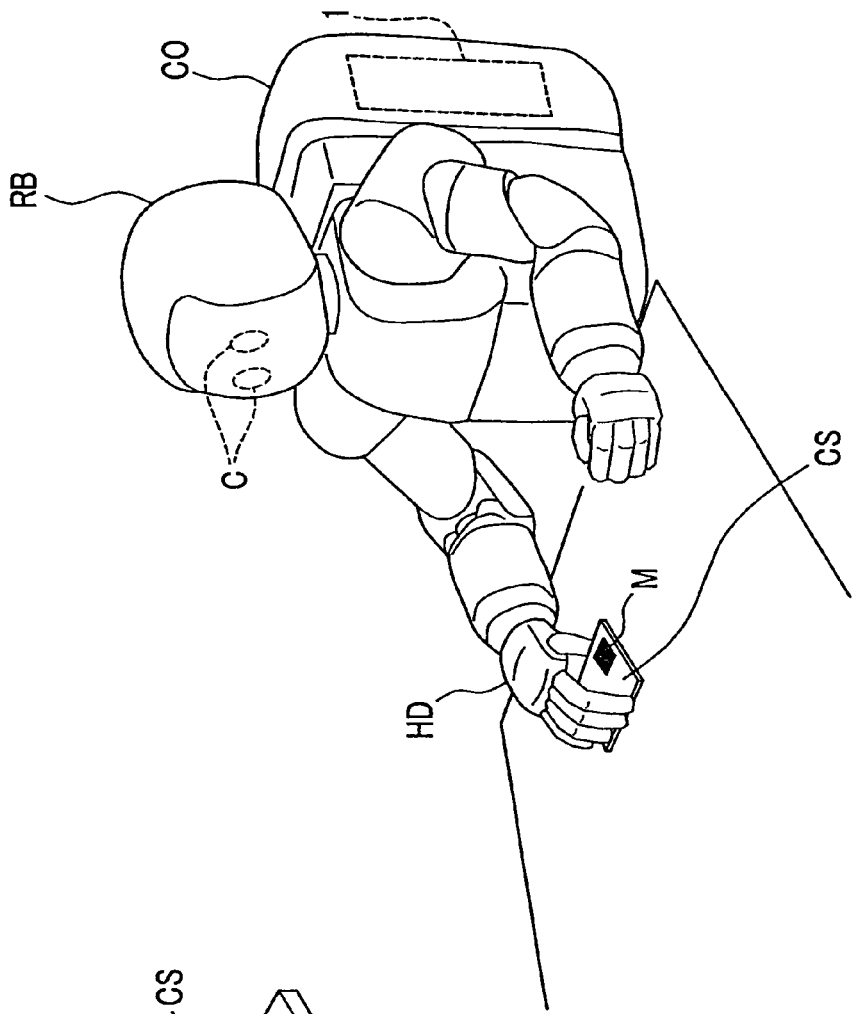
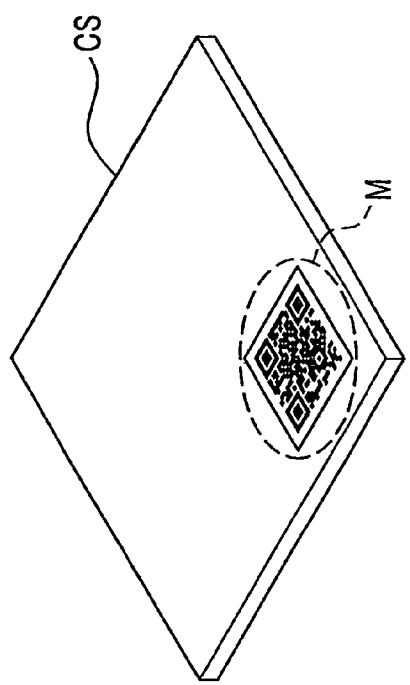
FIG.18A
FIG.18B

ROBOT CONTROL INFORMATION GENERATOR AND ROBOT

CROSS-REFERENCE TO RELATED APPLICATIONS

This application is a divisional of application Ser. No. 11/524,166, filed Sep. 20, 2006, currently pending, which claims the benefit under 35 USC 119 of Japanese Application Number 2005-279179, filed Sep. 27, 2005. The entire subject matter of each of these priority documents is incorporated by reference herein.

BACKGROUND OF THE INVENTION

1. Field of the Invention

The present invention relates to a two-dimensional code detector (2D-code detector) which detects a position and posture of a two-dimensional code (2D-code) provided on an object and also detects information encoded to the 2D-code and a program for this detector. Additionally, the present invention relates to a robot control information generator and a robot.

2. Description of Relevant Art

Conventionally, the recognition of a position and posture of an object by a robot etc. is performed by applying a known model to stereo information of the object that is formed from distance information in a three-dimensional space of the object. However, the estimation of the position and posture of the object has been realized in a limited environment, e.g. such that the object is in a known shape. In a complex scene, the recognition of a target object with speed and precision is difficult under a current computer capacity, and therefore has not been realized at present time.

Therefore, various techniques for assisting the recognition of a position and posture of an object are proposed and for example a system in which a barcode or a two-dimensional code (2D-code) is provided on an object to recognize the position and posture has been discovered in Japanese unexamined patent publication JP No. 2004-1153. In this system, an image pickup of the object, which is provided with the 2D-code and is placed on a table, is performed by an image pickup device. Next, vertices of the 2D-code are detected by analyzing an acquired image obtained by the image pickup. Then, the orientation (rotation) etc. of the object is detected based on the vertices.

In this system, furthermore, a grasp and transfer of the object by a robot is enabled by controlling the posture of the robot in accordance with the orientation of the object.

In this system, additionally, features such as a type, shape, size and etc. of the object can be recognized by decoding data which is encoded into the 2D-code, when the robot grasps the object.

In the system disclosed in Japanese unexamined patent publication JP No. 2004-1153, only an object orientation (rotation) on a two-dimensional plane (table) placed in a predetermined position can be detected as an object posture. That is, in this technique, the posture of an object installed in a three-dimensional space cannot be detected.

Moreover, in the technique described above, features of an object itself are encoded in the 2D-code and are utilized as information used when the robot grasps the object. But, in this case, the position of the object cannot recognize unless the 2D-code has been provided on the object at a certain position. In the conventional system, therefore, the position on the object of the 2D-code has to be recorded beforehand for each object. Thus, the position of the 2D-code has to be recorded again when processing other object, and lacks in versatility.

Therefore, a two-dimensional code detector (2D-code detector), which can recognize a position and posture of an object in a three-dimensional space by detecting a two-dimensional code (2D-code) attached to the object and can generate control information to be required for an operation such as a grasp of the object in a three-dimensional space, and a program thereof have been required. Furthermore, a robot control information generator and a robot incorporated with a robot control information generator, which each can provide the same function of this detector, have been required.

BRIEF SUMMARY OF THE INVENTION

The present invention relates to a two-dimensional code detector detecting a two-dimensional code including a plurality of position identifying patterns, with which the position within the two-dimensional code is specified beforehand, and an information pattern, which is generated by an encoding of information, and the two-dimensional code detector generating control information for an object provided with the two-dimensional code. The two-dimensional code detector includes: an image input unit which inputs an acquired image obtained by an image pickup of the object; a pattern detection unit which detects position identifying patterns within the acquired image input by the image input unit; a position/posture calculation unit which calculates position/posture information indicating a position and posture of the two-dimensional code in a three-dimensional space based on a two-dimensional position of the position identifying patterns detected by the pattern detection unit in the acquired image; a decoding device which decodes the information pattern; and a control information generating unit which generates the control information based on the decoded information decoded by the decoding device and the position/posture information calculated by the position/posture calculation unit.

According to this two-dimensional code detector, an acquired image obtained by an image pickup of an object is entered to the image input unit, and position identifying patterns are detected from a two-dimensional code included in the acquired image by the pattern detection unit. Here, the 2D-code is a code that allows recognition of the two-dimensional code itself and specifies a direction of the two-dimensional code by a plurality of predetermined patterns (position identifying patterns).

In this two-dimensional code detector, furthermore, position/posture information indicating a position and posture of the two-dimensional code in a three-dimensional space is calculated by the position/posture calculation unit, based on the plurality of position identifying patterns in the acquired image. Here, the two-dimensional code in the acquired image can be regarded as one for which a two-dimensional code assumed to be known in size and position has been rotated/translated into a real space (three-dimensional space) and the shifted two-dimensional code has been projective-transformed into the acquired image.

That is, the position/posture calculation unit can compute position/posture information of the two-dimensional code in a three-dimensional space by determining a transformation matrix expressing a rotation/translation based on the plurality of position identifying patterns.

Additionally, in this two-dimensional code detector, the information, which is encoded into information pattern and is recorded in the two-dimensional code, is decoded by the decoding device.

Then, in the two-dimensional code detector, control information which indicates the detail of the control of the object with 2D-code is generated based on the position and posture of the two-dimensional code and decoded information by the control information-generating unit. Thereby, in addition to the position and posture of the 2D-code, the two-dimensional code detector can generate the information, which relates to a size and weight etc. of the object with the 2D-code, and an operation instruction for the object, as control information, based on the decoded information. Here, the 2D-code may be directly painted on the object by printing etc. or may be provided on the object by a seal etc.

In addition, in the two-dimensional code detector of the present invention, the two-dimensional code includes four position-identifying patterns, and the position/posture calculation unit computes position/posture information based on two-dimensional positions of four position-identifying patterns in the acquired image.

According to this configuration, in the two-dimensional code detector, the two-dimensional code includes four position-identifying patterns, and the position/posture calculation unit calculates the position/posture information based on two-dimensional positions of four position-identifying patterns in the acquired image.

In the present invention, furthermore, it is preferable that the two-dimensional code is a QR code (registered trademark).

According to this invention, the position and posture of the QR code can be recognized by adopting the position identifying patterns and alignment pattern of the QR code as the position identifying patterns of the two-dimensional code.

In the present invention, still furthermore, a relative position of a specific position of the object with respect to the position identifying pattern is encoded and is included in the information pattern, and the control information generating unit preferably includes a specific position calculation device which calculates the specific position based on position/posture information calculated by the position/posture calculation unit and the relative position obtained by the decoding in the decoding device.

According to this invention, in the two-dimensional code detector, a position of a designated arbitrary object can be calculated by the specific position calculation device, based on the position/posture information and relative position.

Furthermore, the present invention relates to a two-dimensional code detection program which operates a computer for detecting a two-dimensional code including a plurality of position identifying patterns, with which the position within the two-dimensional code is specified beforehand, and an information pattern, which is generated by an encoding of information, and for generating control information for an object provided with the two-dimensional code.

The two-dimensional code detection program provides, by the computer having pattern detection unit, a position/posture calculation unit, and a decoding device, the functions comprising the steps of: detecting position identifying patterns within an acquired image of the object by the pattern detection unit; computing position/posture information indicating a position and posture of the two-dimensional code in a three-dimensional space by the position/posture calculation unit, based on a two-dimensional position of the position identifying pattern detected by the pattern detection unit in the acquired image; decoding the information pattern by the decoding device; and generating the control information based on the decoded information decoded by the decoding device and the position/posture information calculated by the position/posture calculation unit.

Here, this program preferably includes the step of: computing a specific position, by the specific position calculation device, a specific position based on position/posture information calculated by the position/posture calculation unit and the relative position obtained by the decoding by the decoding device. Here, it is preferable that a relative position of a specific position of the object with respect to the position-identifying pattern of the two-dimensional code is encoded and is included in the information pattern.

According to the two-dimensional code detection program of the present invention: an acquired image obtained by an image pickup of the object is input to the image input unit, and position identifying patterns are detected by the pattern detection unit from a two-dimensional code in the acquired image; then, position/posture information indicating a position and posture of the two-dimensional code in a three-dimensional space is calculated by the position/posture calculation unit based on a plurality of the position identifying patterns in the acquired image, and the information pattern encoded in the two-dimensional code is decoded by the decoding device; and control information for the object with two-dimensional code is generated by control information generating unit based on the position and posture of the two-dimensional code and decoded information.

Additionally, the present invention relates to a robot control information generator which generates control information for operating a robot equipped with a camera and hand to grasp an object, based on a two-dimensional code on the object, wherein the two-dimensional code includes position identifying patterns and an information pattern, and the position within the two-dimensional code of each of the position identifying pattern is specified beforehand, and the information pattern is generated by the encoding of information.

The robot control information generator includes: an image input unit which inputs an acquired image obtained by an image pickup of the object by the camera; a pattern detection unit which detects position identifying patterns within the acquired image inputted by the image input unit; a position/posture calculation unit which calculates position/posture information indicating a position and posture of the two-dimensional code in a three-dimensional space based on a two-dimensional position of the position identifying pattern detected by the pattern detection unit in the acquired image; a decoding device which decodes the information pattern; and a control information generating unit which generates the control information based on the decoded information decoded by the decoding device and the position/posture information calculated by the position/posture calculation unit.

According to this robot control information generator, an acquired image obtained by an image pickup of an object using a camera is entered to the image input unit, and position identifying patterns are detected from a two-dimensional code included in the acquired image by the pattern detection unit.

Then, position/posture information indicating a position and posture of the two-dimensional code in a three-dimensional space is calculated by the position/posture calculation unit, based on the plurality of the position identifying patterns in the acquired image, and the information, which is encoded into information pattern and is recorded as the two-dimensional code, is decoded by the decoding device.

Then, in the robot control information generator, control information indicating the detail of the control of the robot is generated by the control information-generating unit based on the position and posture of the two-dimensional code and decoded information. Here, for example, the control information is an instruction which commands the robot to grasp and transfer the object etc.

In this invention, furthermore, a relative position of a grasping position of the object with respect to the position-identifying pattern of the two-dimensional code is encoded and is included in the information pattern; the grasping position is a position where the robot grasps the object. The control information-generating unit preferably includes a grasping position calculation device calculating the grasping position based on position/posture information, which is calculated by the position/posture calculation unit, and the relative position, which is obtained by the decoding by the decoding unit.

According to such a configuration, the robot control information generator can compute a grasping position to be a designated arbitrary position based on the position/posture information and relative position by the grasping position calculation device.

In this invention, additionally, it is preferable that the object is grasped by the hand based on the control information generated by the robot control information generator.

According to this invention, when the robot grasps the object by the hand, the robot can identify a position of the object by detecting a position and posture of the object based on the control information which is generated by the robot control information generator. Here, the grasping position in grasping the object is a position distant from the position of the two-dimensional code by a predetermined relative position. In addition, the relative position may be encoded in a two-dimensional code.

The present invention provides the following excellent effects.

According to the present invention, a position and posture of a two-dimensional code in a three-dimensional space can be detected, and also information encoded in the two-dimensional code can be read out. This makes it possible to grasp, in addition to a position and posture of an object, various types of information on the object, such as a size and weight etc. For example, a robot that has detected the object can grasp the object as a control operation thereof. At this time, since various types of information (characteristics) on the object can be obtained, the robot can judge as to whether or not it can grasp the object beforehand, so that it becomes possible to carry out an efficient robot control operation.

In addition, according to the present invention, since a position and posture of the two-dimensional code is specified by the four position identifying patterns, even an arbitrary position and posture in a three-dimensional space can be detected.

In addition, according to the present invention, using QR code for the two-dimensional code makes it easy to recognize the two-dimensional patterns, so that the time required for detection of a position and posture can be reduced.

Furthermore, according to the present invention, since an arbitrary position of an object can be specified based on a relative position from a position of the position identifying pattern in the two-dimensional code, even when a robot grasps objects different in size, shape, or the like, it is unnecessary for the robot to store different grasping positions for each of the objects, and versatility can therefore be enhanced.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

FIG. 7 is an explanatory view explaining rules when performing a labeling.

FIG. 14 is a diagram showing a coordinate system of a two-dimensional code.

FIGS. 17A to 17D are the explanatory view showing the conveyance of the box with 2D-code by grasping the box by a robot.

FIG. 18A is an explanatory view of a CD case with 2D-code.

FIG. 18B is an explanatory view showing a grasping of the CD case by a robot.

DETAILED DESCRIPTION OF PREFERRED EMBODIMENTS

Hereinafter, embodiments of the present invention will be described with reference to the attached drawings. A number of working examples of the present invention will be described herein, based on selected illustrative embodiments of the present invention shown in the accompanying drawings.

[Example of Two-dimensional Code: the Configuration of QR Code]

Figure 3:
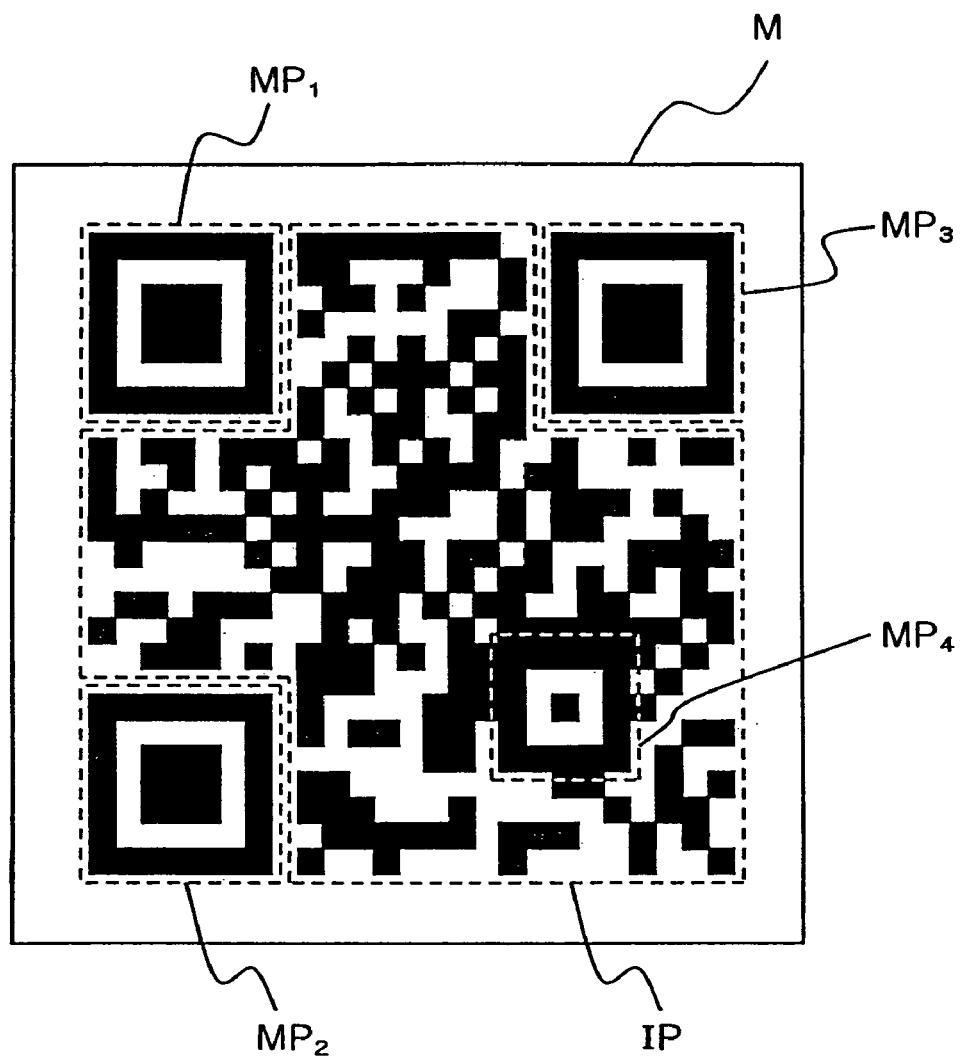
FIG. 3 is a pattern diagram showing an example of a two-dimensional code (QR code) structure.

First, referring to FIG. 3, a structure of a two-dimensional code (2D-code) detected by a two-dimensional code detector (a 2D-code detector) of the present invention will be described. In this embodiment, for example, a QR code is used as the two-dimensional code. FIG. 3 is a pattern diagram showing an example of the 2D-code (QR code) structure. As shown in FIG. 3, a 2D-code (QR code) M is composed of three position detection patterns $MP_1$, $MP_2$, and $MP_3$, an information pattern IP, and an alignment pattern $MP_4$. Here, each position detection pattern comprises specific light-dark patterns within a two-dimensional matrix, and the light-dark patterns have a frequency component ratio of "1:1:3:1:1" at a scanning line that intersects the center of the position detection pattern at every angle. The information pattern IP is obtained by encoding information, and the alignment pattern $MP_4$ is used for regulating a misalignment in respective cells of the information pattern IP at the time of recognition.

In the present invention, a total of four patterns, i.e. the position detection patterns $MP_1$, $MP_2$, and $MP_3$ and the alignment pattern $MP_4$, are used as patterns to specify the position and posture of the 2D-code (position identifying patterns), and the information pattern IP is used as a writing area of control information such as an operation instruction when an object with the 2D-code is employed as an operation target.

Here, QR code has been shown as an example of the 2D-code, however, the shape etc. of the patterns are not limited to a specific shape as long as four position identifying patterns can be specified and information has been written therein. For example, the position identifying patterns may be composed of patterns in different shapes, patterns with different colors, or the like.

[Configuration of 2D-code Detector]

Figure 1:
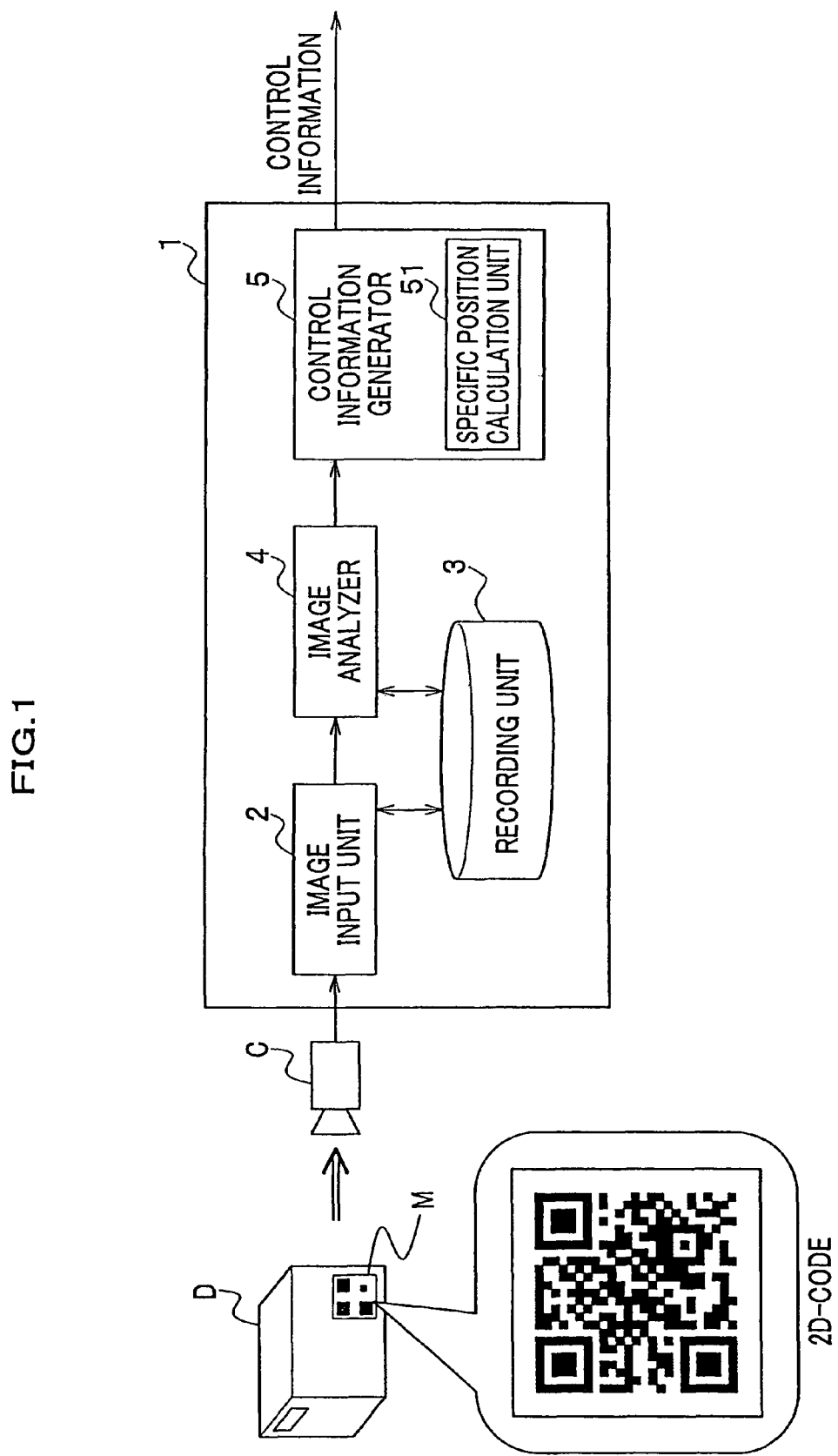
FIG. 1 is a block diagram showing an overall configuration of a 2D-code detector according to the present invention.

Next, referring to FIG. 1, a configuration of a two-dimensional code detector (2D-code detector) according to the present invention will be described. FIG. 1 is a block diagram showing an overall configuration of a 2D-code detector according to the present invention. A 2D-code detector 1 calculates a position and posture of the two-dimensional code (2D-code) M from an acquired image acquired by a camera C, and also decodes encoded data which has been encoded in the 2D-code M. Then, the 2D-code detector 1 outputs decoded information and position/posture information indicating a position and posture of the 2D-code M, as control information.

In this embodiment, the 2D-code detector 1 includes an image input unit 2, a recording unit 3, an image analyzer 4, and a control information generator 5.

The image input unit 2 receives an acquired image (black and white image) for each frame-unit that is acquired by the camera C. Then, the acquired image is recorded on the recording unit 3 and the image analyzer 4 is notified of the input of the acquired image, by the image input unit 2.

The recording unit 3 is a well-known storage device such as a semiconductor memory and stores therein the acquired image entered to the image input unit 2. The recording unit 3 also stores images which are variously produced when the image analyzer 4 performs an image analysis.

The image analyzer 4 detects the 2D-code M within the acquired image by analyzing the acquired image input by the image input unit 2, and calculates a position and posture of the 2D-code M. Then, the image analyzer 4 decodes an information pattern (encoded pattern) that has been encoded in the 2D-code M as a decoded image. The position and posture information and the decoded information analyzed by the image analyzer 4 are output to the control information generator 5.

Figure 2:
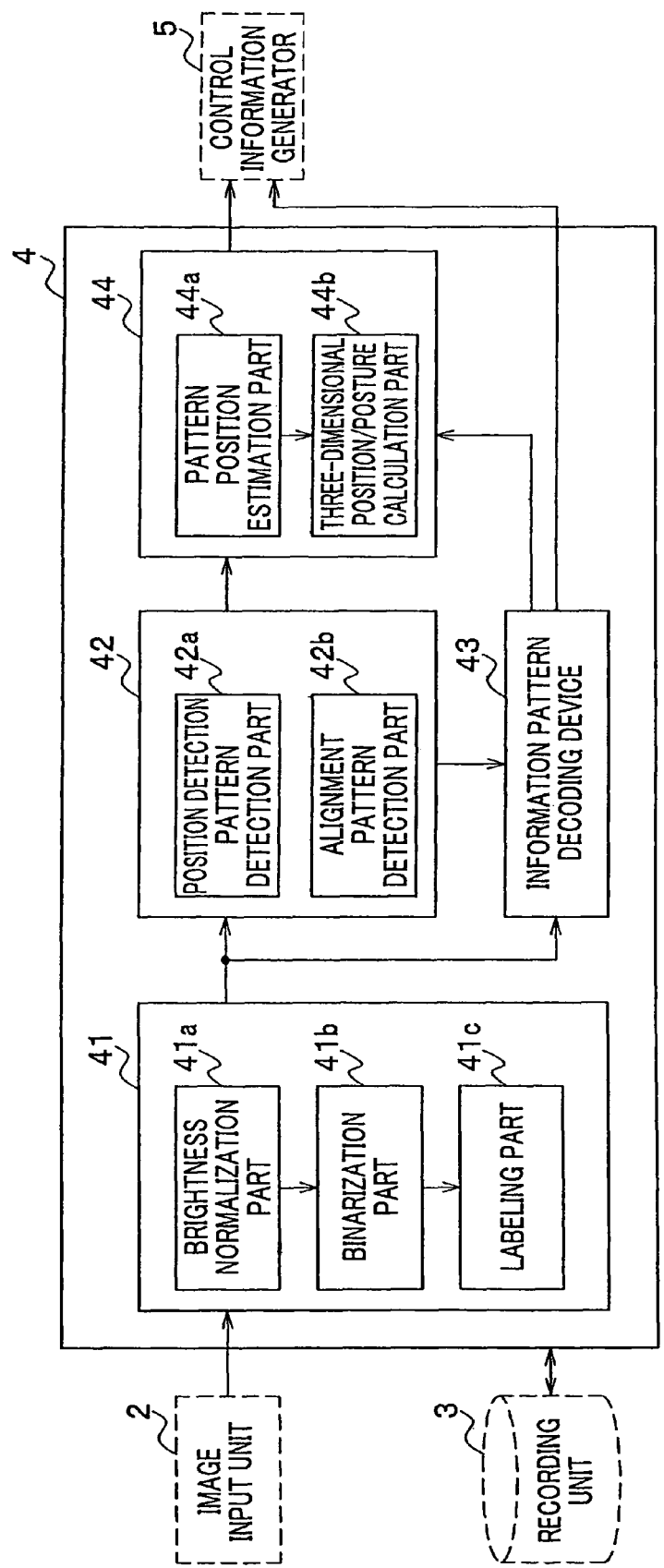
FIG. 2 is a block diagram showing the configuration of an image analyzer of the two-dimensional code detector.

Here, the configuration of the image analyzer 4 will be explained with reference to FIG. 2 and FIG. 1 as appropriate. FIG. 2 is a block diagram showing a configuration of an image analyzer of the 2D-code detector according to the present invention. As shown in FIG. 2, the image analyzer 4 includes an area extraction device 41, a pattern detection device 42, an information pattern-decoding device 43, and a position/posture computing device 44.

The area extraction device 41 extracts areas as a candidate of four position-identifying patterns of the 2D-code M from the acquired image which is input by the image input unit 2 and was stored in the recording unit 3. Here, the area extraction device 41 includes a brightness normalization part 41a, a binarization part 41b, and a labeling part 41c.

The brightness normalization part 41a normalizes the brightness of the acquired image by a brightness compensation of pixels of the acquired image. Generally, a fluctuation in brightness exists within the acquired image due to the influence of illumination etc. Here, since the acquired image is later binarized in the binarization part 41b, the brightness of the acquired image is normalized to generate a brightness-normalized image so that an appropriate binarization is performed on the acquired image.

That is, the brightness normalization part 41a normalizes a light intensity of the acquired image by dividing the light intensity of each pixel in the acquired image by an average of the intensity of peripheral pixels of the pixel. To be more precise, if it is assumed that: the light intensity of a pixel is denoted by "I"; the position of a given pixel is denoted by "(u, v)"; the size in a widthwise direction of a peripheral area centered on the given pixel is denoted by "(2n+1) pixels"; and the size in a lengthwise direction of the peripheral area centered on the given pixel is denoted by "(2m+1) pixels", the brightness normalization part 41a computes a normalized light intensity Ou, v at pixel position (u, v) based on the following formula (1).

$$O_{u,v} = \frac{I_{u,v}}{\sum_{i=-n}^{2n+1} \sum_{j=-m}^{2m+1} I_{u+i,v+j}} \quad (1)$$

Here, the acquired image entered into the brightness normalization part 41a and the brightness-normalized image normalized by the brightness normalization part 41a will be described in detail with reference to FIG. 4 and FIG. 5.

Figure 4:
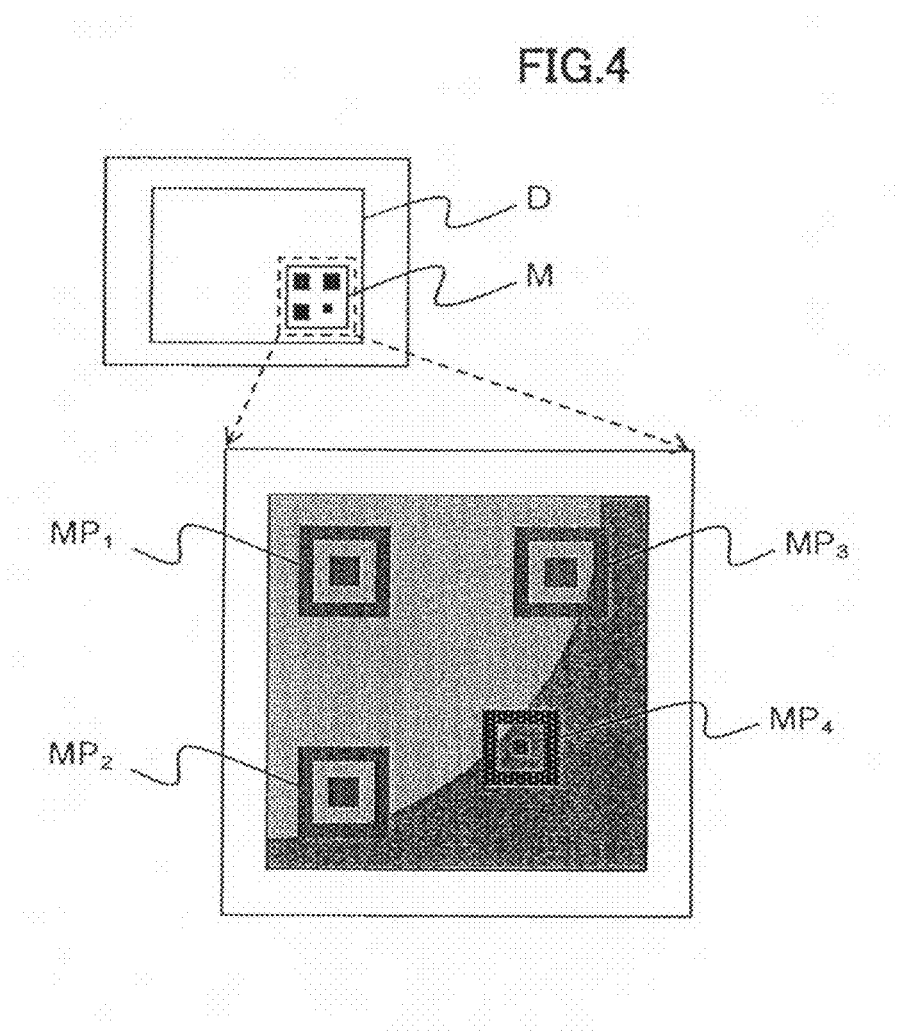
FIG. 4 is a front view showing an image (acquired image) of an object with a two-dimensional code.

FIG. 4 is a front view showing an image (acquired image) of an object with a two-dimensional code.

Figure 5:
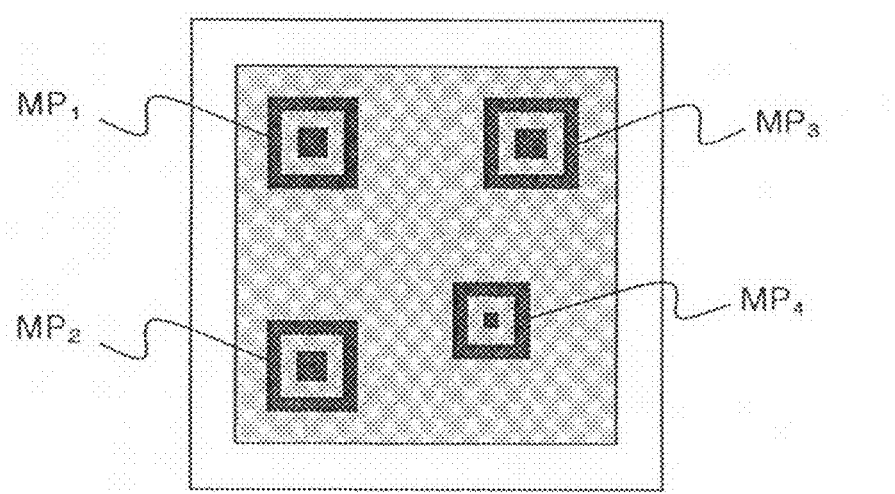
FIG. 5 is a brightness-normalized image obtained by normalization in brightness of the acquired image.

FIG. 5 is a brightness-normalized image obtained by normalization in brightness of the acquired image of FIG. 4.

In FIG. 4 and FIG. 5, the illustration of the information pattern, which is normally included within the 2D-code M together with the position identifying patterns, is omitted for simplifying the explanation. Here, processing, which is the same processing to be performed on the position identifying patterns, is also performed on the information pattern. The detail of the processing will be explained later.

In this embodiment, furthermore, the explanation is made using the image obtained by an image pickup from a front-side of the object with the 2D-code. However, the image on which the 2D-code within the acquired image is inclined can be adoptable, as long as the recognition of the position identifying pattern and the information pattern can be achieved by the following processing to be explained in detail.

FIG. 4 is the front view showing the image obtained by the image pickup of the object D with the 2D-code (QR code), which includes three position detection patterns ($MP_1$, $MP_2$, and $MP_3$) and one alignment pattern $MP_4$. As can be seen from the enlarged view of this FIG. 4, the brightness of the 2D-code becomes dark as it approximates to the peripheral part of the 2D-code. That is, the brightness of the peripheral portion of the object D is lower than that of the center portion of the object D. Therefore, the brightness of the alignment pattern $MP_4$, which is located in the peripheral portion of the object D, is lower than those of the position detection pattern $MP_1$ etc. which are located in the center portion.

In this case, the following results will arise depending on a threshold value, if the binarization of the acquired image is performed without normalization in brightness. That is, only the alignment pattern MP4 is extracted, or a part of the object D is extracted together with the position identifying patterns. Thus, the separation of the position identifying patterns (position detection pattern $MP_1$, $MP_2$, and $MP_3$ and alignment pattern $MP_4$) cannot be achieved appropriately in such a case.

Therefore, the brightness normalization part 41a (FIG. 2) normalizes the brightness of the acquired image shown in FIG. 4 so as to generate the brightness-normalized image shown in FIG. 5. FIG. 5 shows that the brightness of the alignment pattern $MP_4$ located in the peripheral portion is increased and becomes the brightness equivalent to that of the position detection pattern $MP_1$ etc. which are located in the center portion. In this manner, by normalizing the brightness of the acquired image, the position identifying patterns can be equalized in the brightness level.

Next, the description will be continued returning to FIG. 2.

The binarization part 41b generates a binarized image by binarizing each pixel of a brightness-normalized image which is generated by the brightness normalization part 41a, using a predetermined threshold value as a reference.

By this binarization processing, for example, a pixel having a brightness value higher than a threshold value is denoted using "1" and the other pixels are denoted using "0". In the brightness-normalized image generated by the brightness normalization part 41a, since the position identifying patterns is equalized in the brightness level, the threshold value can be determined beforehand based on the brightness level.

Figure 6:
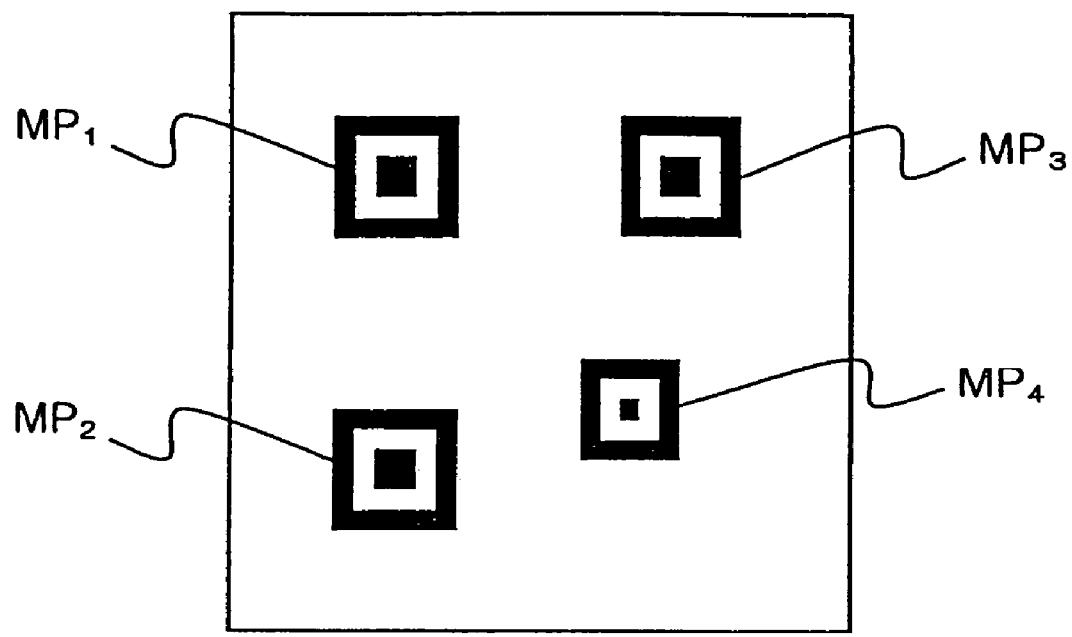
FIG. 6 is a binarized image obtained by binarization of the brightness-normalized image.

As shown in FIG. 6, the binarized image generated by the binarization part 41b is, for example, the image obtained by extracting position identifying patterns (position detection patterns $MP_1$, $MP_2$, and $MP_3$ and alignment pattern $MP_4$) from the brightness normalized image of FIG. 5.

The binarization part 41b, however, may extract the areas having brightness equal to or more than the brightness of the position identifying patterns. That is, the area extracted at this time can be a candidate of position identifying patterns.

The binarized image generated by the binarization part 41b is stored in the recording unit 3 and is referred to by the labeling part 41c.

The labeling part 41c categorizes the areas, which are generated by the binarization part 41b and are extracted as a binarized image, by labeling each area.

Although there are a variety of methods for categorizing (clustering) areas by a labeling, the categorizing in this embodiment is carried out by generating a labeled image in which a pixel value of each area has been set to a value unique to the area by the labeling part 41c. Here, the labeled image generated by the labeling part 41c is stored in the recording unit 3 and is referred to by the pattern detection device 42 and the information pattern decoding device 43.

Here, a method for generating a labeled image by the labeling part 41c will be described with reference to FIG. 7.

FIG. 7 is an explanatory view explaining rules (rules <1> to <5>) for determining a pixel value of a given pixel, by judging each pixel value of pixels (−1, −1), (0, −1), (1, −1) and (−1, 0). Here, the position of the given pixel which serves as a standard position is denoted by (0, 0); the position of the pixel which is an upper left position to the standard position is denoted by (−1, −1); the position of the pixel which is just above the standard position is denoted by (0, −1); the position of the pixel which is the upper right portion to the standard position is denoted by (1, −1); and the position of the pixel which is the left position to the standard position is denoted by (−1, 0).

The labeling part 41c (FIG. 2) scans each image (binarized image) in order from the upper left of the image based on the rules <1> to <5>, to determine a label of the given pixel.

In the binarized image generated by the binarized unit 41b (FIG. 2), the pixel value of areas, which serve as a candidate for position identifying patterns and information pattern, is denoted using "1"; the pixel values of others are denoted using "0"; and a unique "ID" value (label) is assigned to each area.

Moreover, the following rules define operations when all of the pixel value of the given pixel is "1".

Rule <1>: When every pixel values of the pixels (−1, −1), (0, −1), (1, −1), and (−1, 0) is "0", a unique "ID" is assigned to the given pixel (0, 0). For example, a number starting from "100" is used in order.

Rule <2>: When an "ID" has already been assigned to any of the pixels (−1, −1), (0, −1), and (1, −1) and the pixel value of the pixel (−1, 0) is "0", the "ID" assigned to the upper pixel position is assigned to the given pixel (0, 0).

Rule <3>: When each pixel value of the pixels (−1, −1), (0, −1), (1, −1), and (−1, 0) is all "0" and an "ID" has been assigned to the pixel (−1, 0), the "ID" of the pixel (−1, 0) is assigned to the given pixel (0, 0).

Rule <4>: When an "ID" has already been assigned to any of the pixel (−1, −1), (0, −1), and (1, −1) and this is the same as the "ID" assigned to the pixel (−1, 0), the "ID" of the pixel (−1, 0) is assigned to the given pixel (0, 0).

Rule <5>: When different "IDs" have been assigned to the pixel (1, −1) and pixel (−1, 0), the "ID" assigned to the pixel (−1, 0) is assigned to the given pixel (0, 0) and pixels to which the same "ID" as the pixel (1, −1) has been assigned are all relabeled with the "ID" assigned to the pixel (−1, 0).

Figure 8:
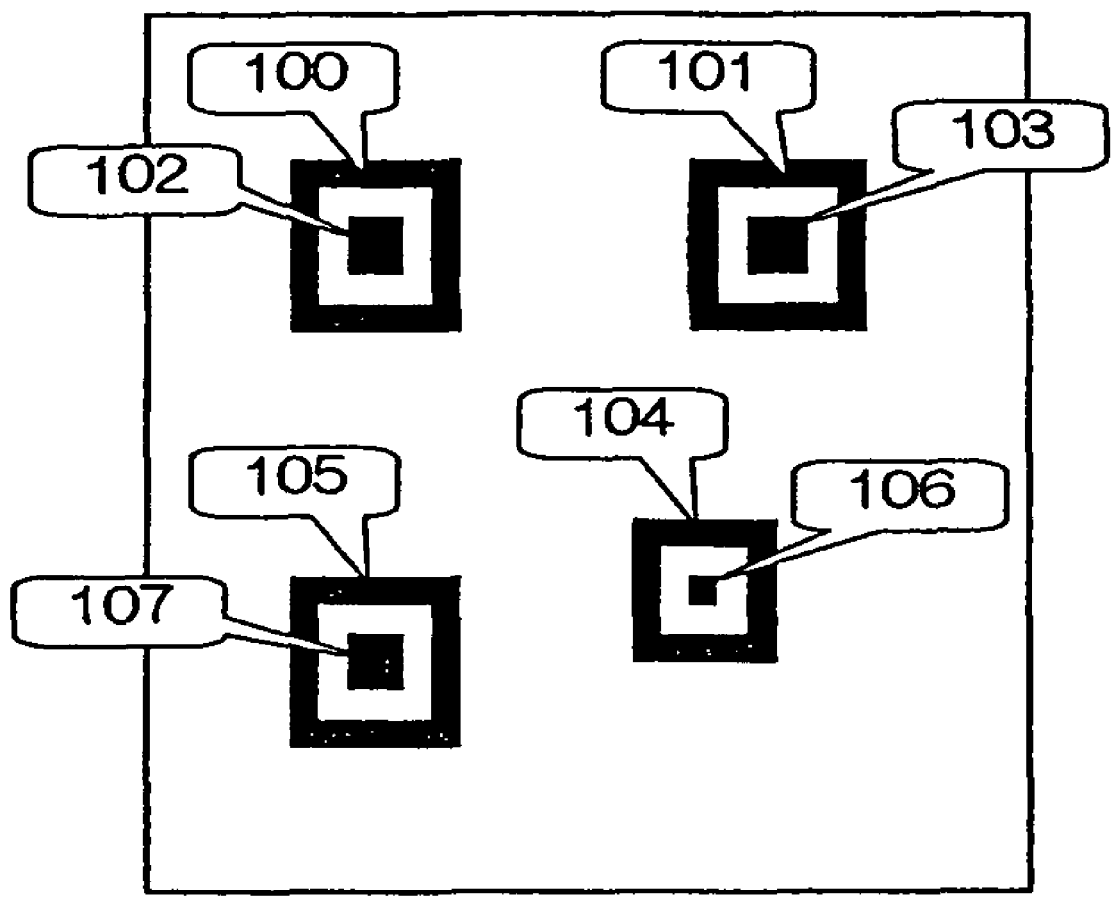
FIG. 8 is a labeled image obtained by the labeling to each area of a binarized image.

When the labeling on the binarized image of FIG. 6 is performed based on the above rules, the labeled image in which unique labels (such as 100 and 101) have been assigned (set) to individual areas is generated (see FIG. 8). Although it is not indicated in this FIG. 8, the unique label is also assigned to each area of the information pattern. As just described above, since the labeling of the binarized image is performed by the labeling part 41c, the acquired image can be handled as the image comprising a plurality of areas (clusters).

Referring to FIG. 2, the pattern detection device 42 detects the position identifying patterns from an acquired image. Here, the pattern detection device 42 includes a position detection pattern detection part 42a and an alignment pattern detection part 42b.

Figure 9:
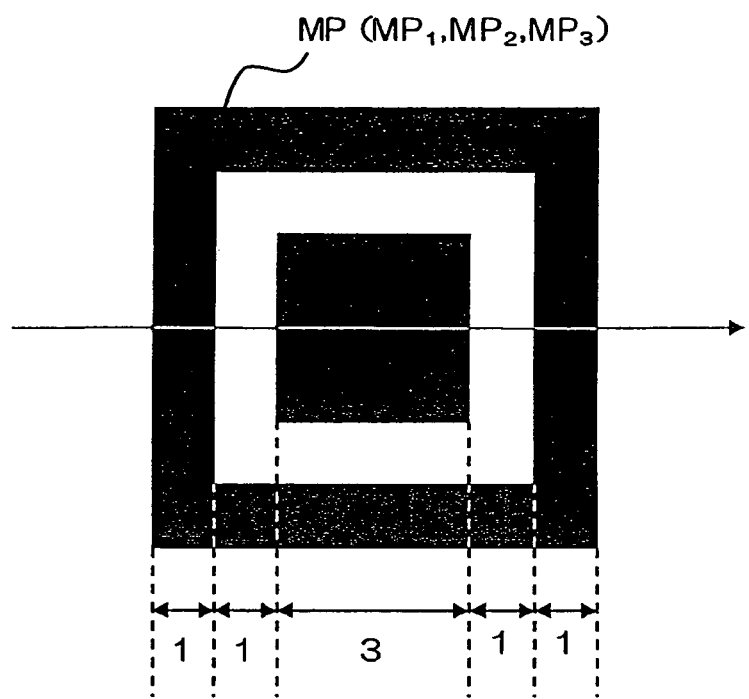
FIG. 9 is a view showing the configuration of a position detection pattern.

The position detection pattern detection part 42a detects a position detection pattern, which is one of position identifying patterns, from the acquired image. Here, since the QR code is adopted as the 2D-code, the position detection pattern detection part 42a detects a position detection pattern MP ($MP_1$, $MP_2$, $MP_3$) by searching a specific pattern from the binarized image generated by the binarization part 41b. Here, as shown in FIG. 9, the specific pattern is a pattern having a ratio of "1:1:3:1:1" as a "black-white-black-white-black" light-dark pattern. In this embodiment, the position detection pattern detection part 42a regards the detected pattern as the position detection pattern when the detected pattern satisfies the following requirements (1) to (3).

Requirement (1): The pattern is a pixel array of "black-white-black-white-black" having a length ratio of "1:1:3:1:

1", when the binarized image is scanned in order from the upper left of the binarized image in a horizontal direction.

Requirement (2): The pattern is a pixel array of "black-white-black-white-black" having a length ratio of "1:1:3:1:1", when the binarized image is scanned in order from the upper left of the binarized image in a vertical direction.

Requirement (3): The same label is assigned to the area, which surrounds the central black area that satisfies requirements (1) and (2), in the labeled image. That is, the peripheral area of the central black area is white.

Then, the position detection pattern detection part 42a regards three patterns that satisfy the above requirements (1) to (3) as the position detection pattern, and outputs each label of the black area in the center of the position detection pattern to the alignment pattern detection part 42b, information pattern-decoding device 43, and position/posture computing device 44.

Figure 10:
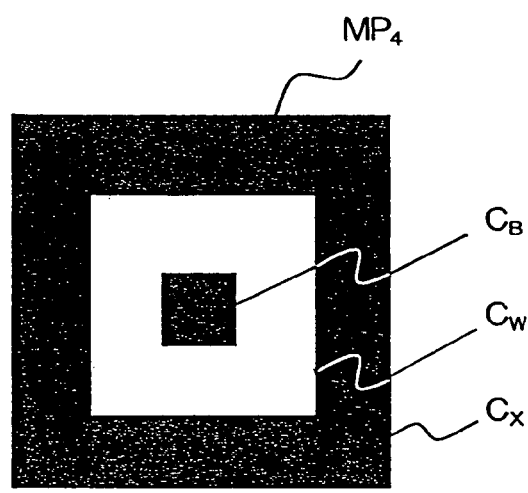
FIG. 10 is a view showing the configuration of an alignment pattern.

The alignment pattern detection part 42b detects the alignment pattern which is one of the position identifying patterns from the acquired image. As shown in FIG. 10, the alignment pattern $MP_4$ comprises a cluster $C_B$ which is a center black area, a cluster $C_W$ which is a white area surrounding the cluster $C_B$, and a cluster $C_X$ which is a black area surrounding the cluster $C_W$. Here, each cluster ($C_B$, $C_X$ and $C_W$) has a rectangular shape, and the cluster $C_X$ is coupled with another black point (see FIG. 2). For this reason, the alignment pattern cannot be detected based on a light-dark pattern ratio as in the position detection pattern. In this embodiment, therefore, the detection of the alignment pattern is performed based on the fact that the position of the center of gravity of the cluster $C_B$ and cluster $C_W$ is the same.

That is, as shown in FIG. 3, the alignment pattern detection part 42b defines the rectangle which has each position of three position detection patterns ($MP_1$, $MP_2$, and $MP_3$) as three of four vertices. Next, the alignment pattern detection part 42b calculates the position of the center of gravity of areas (clusters) which exist within the vicinity of the remainder vertex of four vertices of the rectangle. Then, the alignment pattern detection part 42b selects two areas in which the center of gravity positions are closest, and determined as the alignment pattern $MP_4$.

Then, the alignment pattern detection part 42b outputs the label of the determined alignment pattern to the information pattern-decoding device 43 and position/posture computing device 44.

The information pattern-decoding device (decoding device) 43 decodes the information pattern (encoded pattern) described in the 2D-code M to obtain decoded information.

Here, the information pattern-decoding device 43 recognizes the area where the information pattern is described, based on the position of the position identifying patterns (three position detection patterns and one alignment pattern), which are detected by the pattern detection device 42. Then, the information pattern-decoding device 43 decodes the information pattern. Here, the encoding method of the information pattern is not limited to this example, and the method compliant with the QR code may be employed.

Then, the information pattern decoding device 43 outputs the decoded information to the position/posture computing device 44 and control information generator 5.

When the information pattern decoding device 43 cannot decode the information pattern for such a reason that the information pattern does not comply with a predetermined encoding method, it is judged that a pattern identical to position identifying patterns has existed in the acquired image.

Then, it is determined that the computing of a position/posture based on the pattern is not carried out by the position/posture computing device 44.

The position/posture computing device 44 computes position/posture information which indicates the position and posture of the 2D-code M in a three-dimensional space. Here, the position/posture computing device 44 includes a pattern position estimation part 44a and a three-dimensional position/posture computing part 44b.

The pattern position estimation part 44a determines a position with high accuracy not more than one pixel unit, in each area (two-dimensional plane) of the position identifying patterns (three position detection patterns and one alignment pattern). Here, the pattern position estimation part 44a determines the center position of each area of the position identifying patterns.

Figure 11:
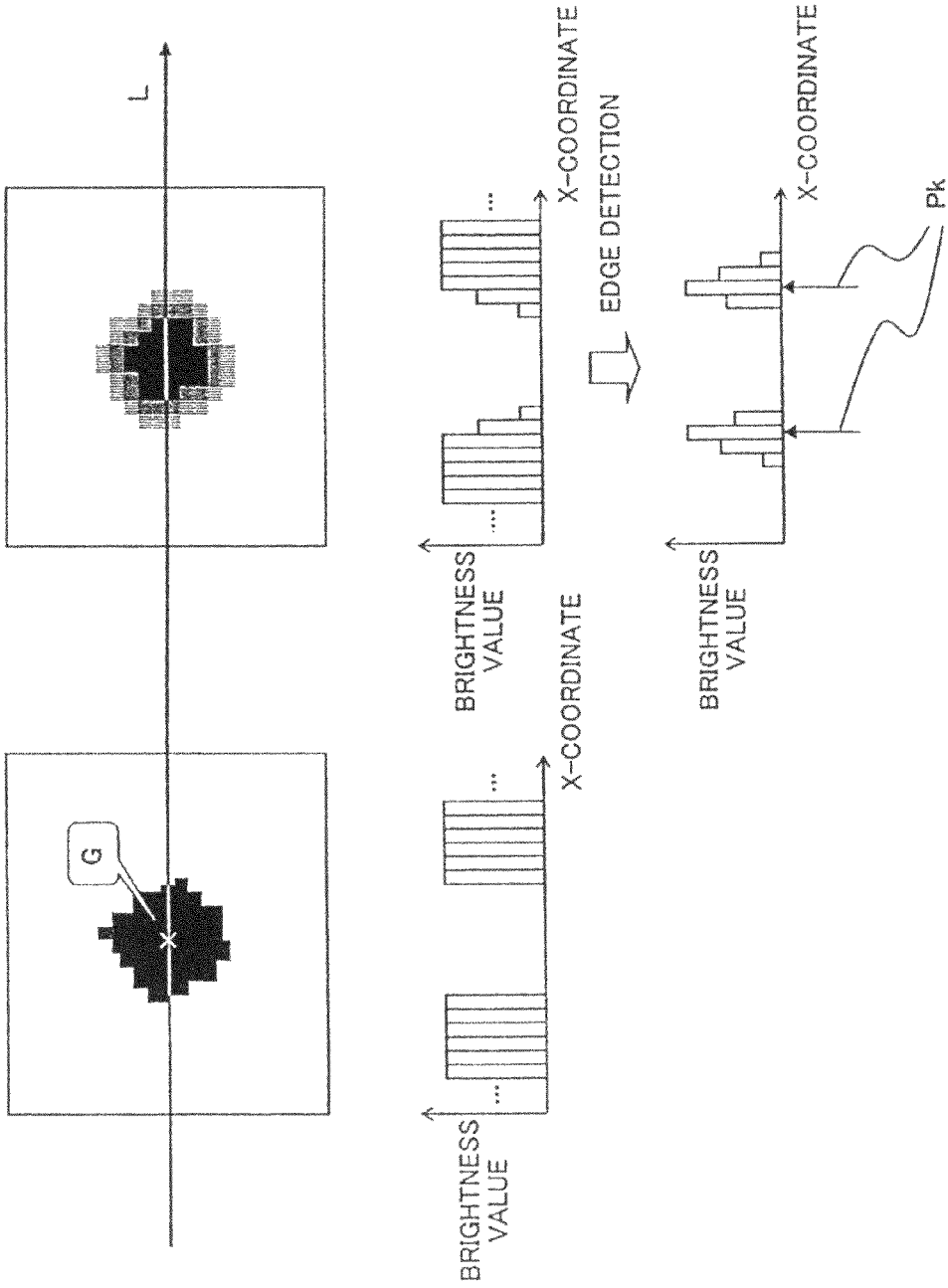
FIGS. 11A and 11B are explanatory view for explaining a method for estimating a center position of the position-identifying pattern.

Here, the method for determining the center position of each of position identifying patterns located at the four corners of the 2D-code by the pattern position estimation part 44a will be explained with reference to FIG. 11A and FIG. 11B and appropriately to FIG. 2. FIG. 11A and FIG. 11B are respectively explanatory views for explaining the method for estimating the center position of the position-identifying pattern.

The pattern position estimation part 44a determines the center position of a cluster on straight lines extending horizontally and vertically from the center of gravity G of the cluster (black rectangular area) located at the center of each position-identifying pattern included in the binarized image (FIG. 6), which is generated by the binarization part 41b.

Here, for a simplification of a description, the description will be given for the case where the center position in the horizontal direction of the cluster is determined based on a straight line L in the horizontal direction.

As shown in FIG. 11A, in the binary image, the brightness value is expressed with a binary value, and the accuracy of a boundary region depends on the size of a pixel. Therefore, as shown in FIG. 11B, the pattern position estimation part 44a detects an edge on the straight line L in the acquired image (gray-scale image) which was entered from the image input unit 2, and the pattern position estimation part 44a determines the position (peak position Pk) where the edge becomes a peak in brightness value, as a cluster boundary.

In this embodiment, the cluster boundary in a vertical direction is also determined by the similar way. Then, a middle between boundaries in the horizontal direction and the middle between boundaries in the vertical direction are determined as the center position of the cluster by the pattern position estimation part 44a. Thereby, the pattern position estimation part 44a can determine the center position of the cluster, with high accuracy not more than one pixel size. That is, the center position of the position-identifying pattern can be determined with high accuracy.

Referring to FIG. 2, the three-dimensional position/posture computing part 44b computes position/posture information which indicates a position and posture in a three-dimensional space, based on center positions of position identifying patterns (three position detection patterns and one alignment pattern) which are detected by the pattern detection device 42. Then, the three-dimensional position/posture computing part 44b outputs position/posture information to the control information generator 5.

Generally, the position and posture of the object can be determined if coordinates Q in a three-dimensional space is determined at four points, in case that the known coordinates Q in a three-dimensional space of the object is shifted to the unknown coordinates T by rotation and/or translation and the unknown coordinates T is transformed into the known coordinate S within two-dimensional plane by a projection.

Figure 12:
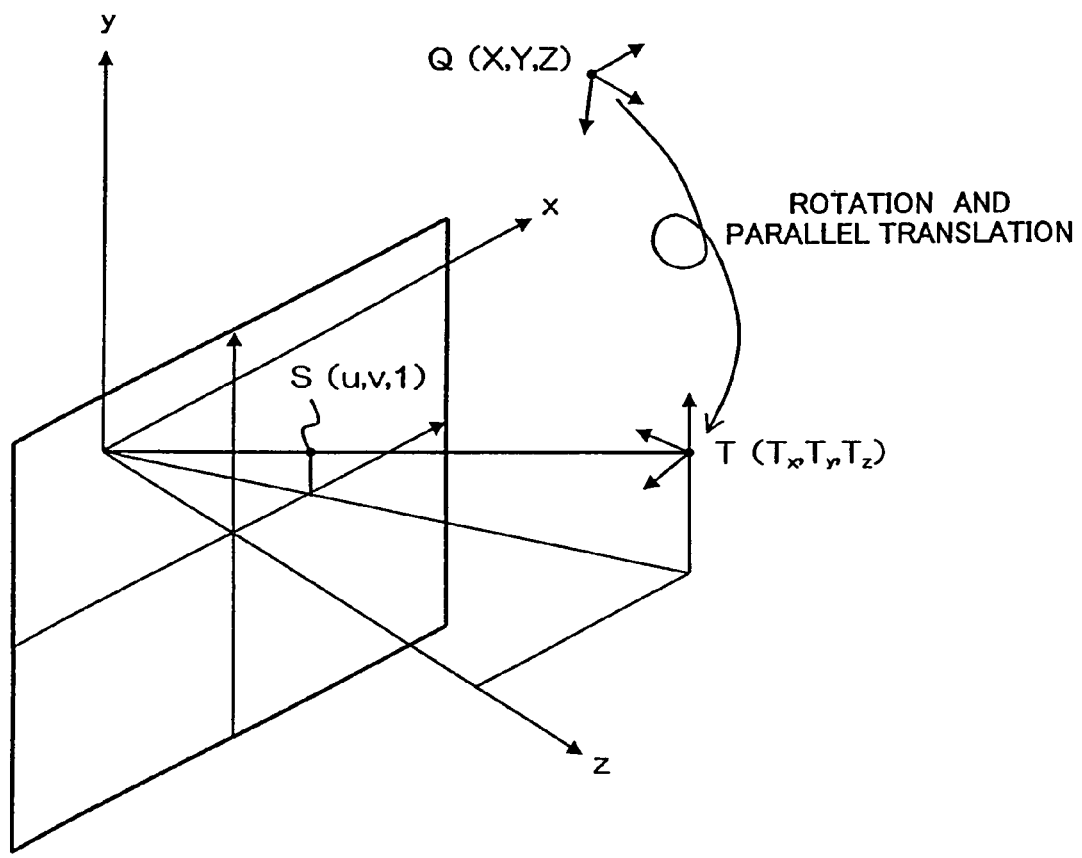
FIG. 12 is an explanatory view for explaining a method for computing a three-dimensional position.
Figure 13:
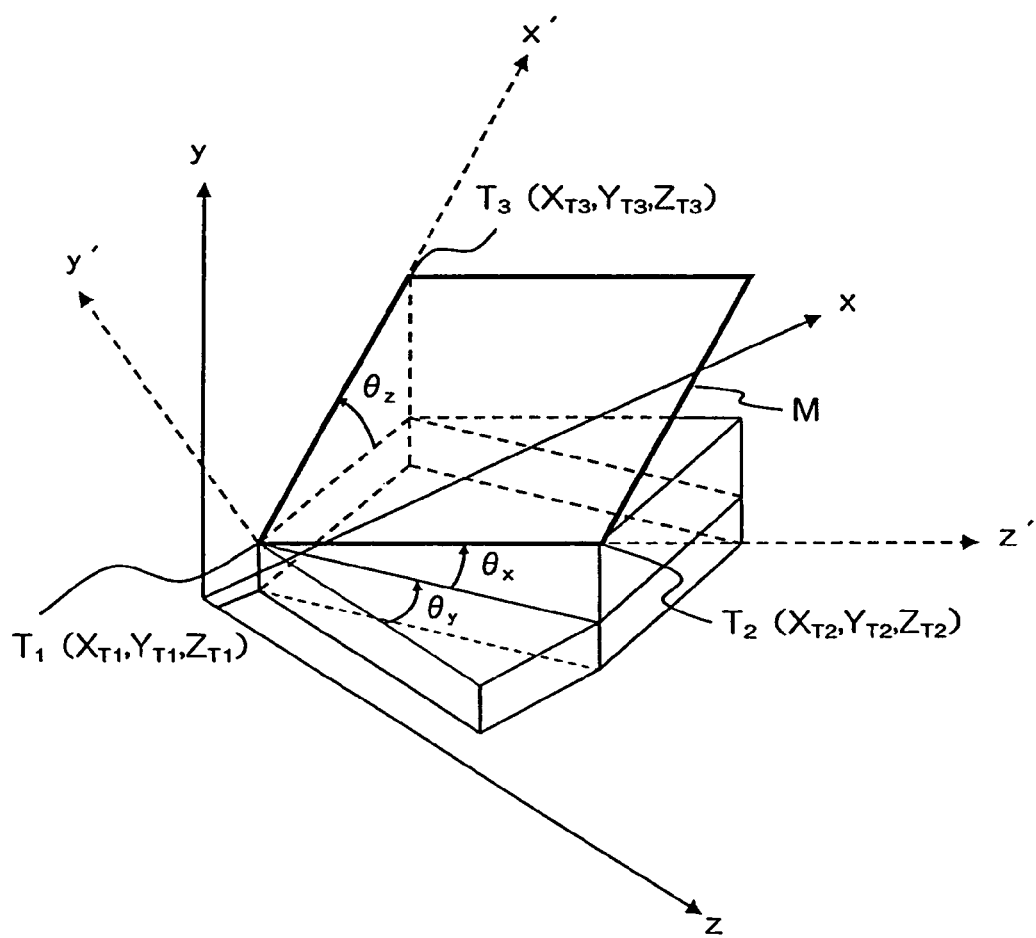
FIG. 13 is an explanatory view for explaining a method for computing a three-dimensional posture.

Here, a method for computing a three-dimensional position and posture of the 2D-code based on four points of the 2D-code on the object will be explained with reference to FIG. 12 and FIG. 13 and appropriately FIG. 2. FIG. 12 is an explanatory view of a method for computing a three-dimensional position. FIG. 13 is an explanatory view of a method for computing a three-dimensional posture.

FIG. 12 shows the condition where the center of a two-dimensional plane (xy coordinate system) is located at three-dimensional coordinates (0, 0, 1) and the two-dimensional plane is in parallel to a xy-plane in a coordinate system (xyz coordinate system) of a three-dimensional space.

In this figure, additionally, it is shown that known coordinates Q (X, Y, Z) in a three-dimensional space is shifted to the coordinates T ($T_x$, $T_y$, $T_z$) by a transformation matrix P, which causes a certain rotation/shift transformation and that the coordinates T is projected on the coordinates S(u, v) in two-dimensional plane. Here, the coordinates S (u, v) corresponds to the coordinates (u, v, 1) in the three-dimensional coordinates. Here, the coordinate system in a three-dimensional space is a coordinate system used by the position/posture computing device 44. Also, the coordinates Q indicate the position of the position-identifying pattern in a predetermined three-dimensional space, and is, for example, located in a three-dimensional space where the z-axis value is zero ("0", Z=0)(see FIG. 14). In addition, the coordinates T correspond to the position of the position identifying pattern of the 2D-code being actually provided on the object, and the coordinates S correspond to two-dimensional coordinates on the acquired image.

In this embodiment, the transformation matrix P, which causes a rotation/shift transformation, is indicated by the following formula (2). Here, $P_{11}$ to $P_{13}$, $P_{21}$ to $P_{23}$, and $P_{31}$ to $P_{33}$ denote rotational components, and $P_{14}$, $P_{24}$, and $P_{34}$ denote shift components.

$$P = \begin{bmatrix} P_{11} & P_{12} & P_{13} & P_{14} \\ P_{21} & P_{22} & P_{23} & P_{24} \\ P_{31} & P_{32} & P_{33} & P_{34} \end{bmatrix} \quad (2)$$

Then, as can be seen from the following formula (3), the coordinates T ($T_x$, $T_y$, $T_z$) can be computed by transforming the known coordinates Q (X, Y, Z) by the transformation matrix P.

$$\begin{bmatrix} T_x \\ T_y \\ T_z \end{bmatrix} = P \begin{bmatrix} X \\ Y \\ Z \\ 1 \end{bmatrix} \quad (3)$$

That is, the coordinates T which are the position of the position-identifying pattern of the 2D-code in a three-dimensional space can be specified when the transformation matrix P is determined.

Hereinafter, the respective components of the transformation matrix P will be determined.

Here, the coordinates T ($T_x$, $T_y$, $T_z$) are projected to the coordinates S (u, v) on a two-dimensional plane. In other words, the coordinates T ($T_x$, $T_y$, $T_z$) are projected to the coordinates (u, v, 1) in the three-dimensional coordinate. Therefore, the relation between the coordinates T and the coordinates S can be indicated by the following formula (4), when using a constant w.

$$w \begin{bmatrix} u \\ v \\ 1 \end{bmatrix} = \begin{bmatrix} T_x \\ T_y \\ T_z \end{bmatrix} \quad (4)$$

Then, based on the formula (3) and the formula (4), the relation expressed with the following formula (5) can be formulated.

$$w \begin{bmatrix} u \\ v \\ 1 \end{bmatrix} = P \begin{bmatrix} X \\ Y \\ Z \\ 1 \end{bmatrix} \quad (5)$$

Here, the transformation matrix P shown as formula (2) is transformed to the following formula (6). Here, $P_{11}/P_{34}$ and others are replaced with new variables including $a_{11}$ and others.

$$P = \begin{bmatrix} P_{11} & P_{12} & P_{13} & P_{14} \\ P_{21} & P_{22} & P_{23} & P_{24} \\ P_{31} & P_{32} & P_{33} & P_{34} \end{bmatrix} \quad (6)$$

$$= P_{34} \begin{bmatrix} \frac{P_{11}}{P_{34}} & \frac{P_{12}}{P_{34}} & \frac{P_{13}}{P_{34}} & \frac{P_{14}}{P_{34}} \\ \frac{P_{21}}{P_{34}} & \frac{P_{22}}{P_{34}} & \frac{P_{23}}{P_{34}} & \frac{P_{24}}{P_{34}} \\ \frac{P_{31}}{P_{34}} & \frac{P_{32}}{P_{34}} & \frac{P_{33}}{P_{34}} & 1 \end{bmatrix}$$

$$= P_{34} \begin{bmatrix} a_{11} & a_{12} & a_{13} & a_{14} \\ a_{21} & a_{22} & a_{23} & a_{24} \\ a_{31} & a_{32} & a_{33} & 1 \end{bmatrix}$$

Here, $P_{11}$ to $P_{13}$, $P_{21}$ to $P_{23}$, and $P_{31}$ to $P_{33}$ denote components of a rotating matrix, and the relationships expressed with the following formula (7) and formula (8) can be formulated, due to an orthonormality thereof.

$$a_{11}a_{21}+a_{12}a_{22}+a_{13}a_{23}=0$$

$$a_{21}a_{31}+a_{22}a_{32}+a_{23}a_{33}=0$$

$$a_{31}a_{11}+a_{32}a_{12}+a_{33}a_{13}=0 \quad (7)$$

$$\sqrt{a_{11}^2+a_{12}^2+a_{13}^2} = \sqrt{a_{21}^2+a_{22}^2+a_{23}^2} = \sqrt{a_{31}^2+a_{32}^2+a_{33}^2} = \frac{1}{P_{34}} \quad (8)$$

In addition, when if $w/P_{34}=W$ is provided, based on the formula (5) and formula (6), the relationship expressed with the following formula (9) can be formulated.

$$W \begin{bmatrix} u \\ v \\ 1 \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & 1 \end{bmatrix} \begin{bmatrix} X \\ Y \\ Z \\ 1 \end{bmatrix} \quad (9)$$

The following formula (10) is formulated by expanding and transforming the formula (9).

$$W_u = a_{11}X + a_{12}Y + a_{13}Z + a_{14}$$

$$W_v = a_{21}X + a_{22}Y + a_{23}Z + a_{24}$$

$$W = a_{31}X + a_{32}Y + a_{33}Z + 1 \quad (10)$$

Then, the following formula (11) is formulated by substituting the W of third formula in this formula (10) for the first and second formulas and then by transforming into linear expressions with respect to a ($a_{11}, a_{12}, \ldots, a_{33}$).

$$Xa_{11}+Ya_{12}+Za_{13}+a_{14}-uXa_{31}-uYa_{32}-uZa_{33}=u$$

$$Xa_{21}+Ya_{22}+Za_{23}+a_{24}-vXa_{31}-vYa_{32}-vZa_{33}=v \quad (11)$$

Here, X, Y, Z, u, and v are known values, and a total of eleven components ($a_{11}, a_{12}, a_{13}, a_{14}, a_{21}, a_{22}, a_{23}, a_{24}, a_{31}, a_{32}$, and $a_{33}$) are unknown numbers. That is, at this stage, the formula (11) cannot be solved unless the positions of six points are measured.

Here, since the 2D-code is a plane in this embodiment, this allows determining that the 2D-code is on the XY-plane, where Z is zero (z=0), in a three-dimensional space (see FIG. 14).

Therefore, if assuming that Z is zero (Z=0), the formula (11) can be expressed with the following formula (12).

$$Xa_{11}+Ya_{12}+Za_{13}+a_{14}-uXa_{31}-uYa_{32}=u$$

$$Xa_{21}+Ya_{22}+Za_{23}+a_{24}-vXa_{31}-vYa_{32}=v \quad (12)$$

In this formula (12), there are in total of eight unknown numbers ($a_{11}, a_{12}, a_{14}, a_{21}, a_{22}, a_{24}, a_{31}$, and $a_{32}$), and these unknown numbers can be specified by measuring the positions of four points.

Here, as shown in the following formula (13), it is assumed that four points $Q_1$ ($X_1, Y_1, 0$), $Q_2$ ($X_2, Y_2, 0$), $Q_3$ ($X_3, Y_3, 0$), and $Q_4$ ($X_4, Y_4, 0$) in a three-dimensional space are projected onto four points ($u1, v1$), ($u2, v2$), ($u3, v3$), and ($u4, v4$) on a two-dimensional plane.

$$(X_1, Y_1, 0) \rightarrow (u_1, v_1)$$

$$(X_2, Y_2, 0) \rightarrow (u_2, v_2)$$

$$(X_3, Y_3, 0) \rightarrow (u_3, v_3)$$

$$(X_4, Y_4, 0) \rightarrow (u_4, v_4) \quad (13)$$

Here, four points ($Q_1, Q_2, Q_3$, and $Q_4$) in the three-dimensional space indicate the size of the 2D-code. In this embodiment, each of the coordinates of these points ($Q_1, Q_2, Q_3$, and $Q_4$) may be stored in advance in the recording unit 3 so that the position/posture computing device 44 can read out the coordinates when computing position/posture information.

In this embodiment, furthermore, each of the coordinates of these points ($Q_1, Q_2, Q_3$, and $Q_4$) may be encoded to the information pattern within the 2D-code and may be referred to by the position/posture-computing device 44 after the decoding by the information pattern-decoding device 43.

Then, by solving the following formula (14) based on the formula (12) and formula (13), the unknown numbers ($a_{11}, a_{12}, a_{14}, a_{21}, a_{22}, a_{24}, a_{31}$, and $a_{32}$) can be specified.

$$\begin{bmatrix} u_1 \\ v_1 \\ u_2 \\ v_2 \\ u_3 \\ v_3 \\ u_4 \\ v_4 \end{bmatrix} = \begin{bmatrix} X_1 & Y_1 & 1 & 0 & 0 & 0 & -u_1X_1 & -u_1Y_1 \\ 0 & 0 & 0 & X_1 & Y_1 & 1 & -v_1X_1 & -v_1Y_1 \\ X_2 & Y_2 & 1 & 0 & 0 & 0 & -u_2X_2 & -u_2Y_2 \\ 0 & 0 & 0 & X_2 & Y_2 & 1 & -v_2X_2 & -v_2Y_2 \\ X_3 & Y_3 & 1 & 0 & 0 & 0 & -u_3X_2 & -u_3Y_3 \\ 0 & 0 & 0 & X_3 & Y_3 & 1 & -v_3X_3 & -v_3Y_3 \\ X_4 & Y_4 & 1 & 0 & 0 & 0 & -u_4X_4 & -u_4Y_4 \\ 0 & 0 & 0 & X_4 & Y_4 & 1 & -v_4X_4 & -v_4Y_4 \end{bmatrix} \begin{bmatrix} a_{11} \\ a_{12} \\ a_{14} \\ a_{21} \\ a_{22} \\ a_{24} \\ a_{31} \\ a_{32} \end{bmatrix} \quad (14)$$

The remaining unknown numbers ($a_{13}, a_{23}$, and $a_{33}$) can be specified by solving the formula (7) using the ($a_{11}, a_{12}, a_{14}, a_{21}, a_{22}, a_{24}, a_{31}$, and $a_{32}$) specified by the formula (14).

In addition, by solving the following formula (15) based on the formula (8), $P_{34}$ can be specified.

$$P_{34} = \frac{2}{\sqrt{a_{11}^2 + a_{12}^2 + a_{13}^2} + \sqrt{a_{21}^2 + a_{22}^2 + a_{23}^2}} \quad (15)$$

By the variables ($a_{11}, a_{12}, a_{13}, a_{14}, a_{21}, a_{22}, a_{23}, a_{24}, a_{31}, a_{32}$, and $a_{33}$) and $P_{34}$ identified in this manner, the transformation matrix P can be determined based on the formula (6).

Thus, the position of the 2D-code can be specified based on the formula (3), by detecting at least one of four points (three position detection patterns and one alignment pattern) of the 2D-code (QR code), e.g. the center position of the position detection pattern $MP_1$ (see FIG. 3). In this description, three-dimensional coordinates of the center position of the position detection pattern $MP_1$ (see FIG. 3) is provided as position information of the position/posture information of the 2D-code.

Next, a method for computing the three-dimensional posture of the 2D-code will be described with reference to FIG. 13. FIG. 13 shows the condition where the 2D-code M is rotated with reference to a center $T_1$ ($X_{T1}, Y_{T1}, Z_{T1}$) of the position detection pattern $MP_1$ (refer to FIG. 3) around an x-axis, a y-axis, and a z-axis, respectively, in a coordinate system (xyz coordinate system) of a three-dimensional space.

In this case, the posture of the 2D-code M can be shown by the angles $\theta_x, \theta_y$, and $\theta_z$, and can be computed by the following formula (16).

$$\theta_x = \arctan\left(\frac{Y_{T2} - Y_{T1}}{\sqrt{(X_{T2} - X_{T1})^2 + (Z_{T2} - Z_{T1})^2}}\right) \quad (16)$$

$$\theta_y = \arctan\left(\frac{X_{T2} - X_{T1}}{Z_{T2} - Z_{T1}}\right)$$

$$\theta_z = \arctan\left(\frac{Y_{T3} - Y_{T1}}{\sqrt{(X_{T3} - X_{T1})^2 + (Z_{T3} - Z_{T1})^2}}\right)$$

In this manner, based on three points out of four points (center positions of three position detection patterns and one alignment pattern) in the 2D-code (QR code) M, the posture of the 2D-code can be specified. Here, the rotation angles around the three axes at the center position of the position detection pattern MP, (see FIG. 3) are provided as posture information of the position/posture information of the 2D-code.

In this embodiment, position/posture information of the 2D-code is expressed with the three-dimensional coordinates of one position and rotation angles around three axes. However, the information is not limited to the example of this embodiment as long as the amount of information is enough to express a position and posture.

For example, the information may be expressed by: three-dimensional coordinates of three positions (e.g. center position coordinates ($T_1, T_2$, and $T_3$) of position detection patterns); three-dimensional coordinates of two positions; a rotation angle around one axis (e.g. center position coordinates ($T_1$ and $T_2$) of position detection patterns); and the angle $\square_z$ etc.

In this embodiment, moreover, position/posture information of the 2D-code is computed based on the positions of four points. However, since unknown numbers amount to six pixels when X or Y in formula (12) is further determined as a fixed value, the unknown numbers can be specified by measuring the positions of three points. That is, in this case, position/posture information can be computed by measuring the position of three points (three points of position identifying pattern) from among 2D-code.

According to the image analyzer 4 having the above-described configurations, the image analyzer 4 can detect a position and posture in the 2D-code from the acquired image acquired by the camera C (see FIG. 1), and decode the encoded pattern which is written in the two-dimensional code.

Next, the explanation will be made about the configuration of the 2D-code decoder 1 with reference to FIG. 1.

The control information generator 5 generates control information based on the position, the posture, and the decoded information which are analyzed by the image analyzer 4. Here, control information is the information for controlling the operation of a controller (e.g. a robot (not shown)) which handles a target object (e.g. object D such as a box) provided with the 2D-code M.

When, for example, decoded information includes information which commands the robot to carry the object D to a certain spot, the control information generator 5 generates control information by which the robot performs the following operations in order of: a grasping of the object D; a moving to the spot; and a releasing of the object D. Then, the control information generator 5 outputs the generated control information to the robot.

On this occasion, if the information (supplementary information) relating to a size, hardness, weight etc. is included in the decoded information, the control information generator 5 adds the supplementary information to control information. Thereby, the robot input with the control information can judge whether or not the grasping of the object D can be achieved, based on the size and weight etc.

In this embodiment, moreover, the control information generator 5 includes a specific position calculation unit 51. The specific position calculation unit 51 calculates a position of the object D (an operation target), based on the position/posture information which indicates the position and posture of the 2D-code computed by the position/posture computing device 44 and on decoded information.

The specific position calculation unit 51 (specific position calculator and grasping position calculator) calculates a operation target position of the object in a three-dimensional space based on the position/posture information computed by the position/posture computing device 44 of the image analyzer 4 (FIG. 2), when a relative position between the 2D-code and the operation target position is included in the decoded information. Here, the operation target position is the position where the controller (robot) handles the object D, and when the robot performs the grasping of the object D, for example, the operation target position is the information which indicates the position where the robot grasps the object D.

Figure 15A:
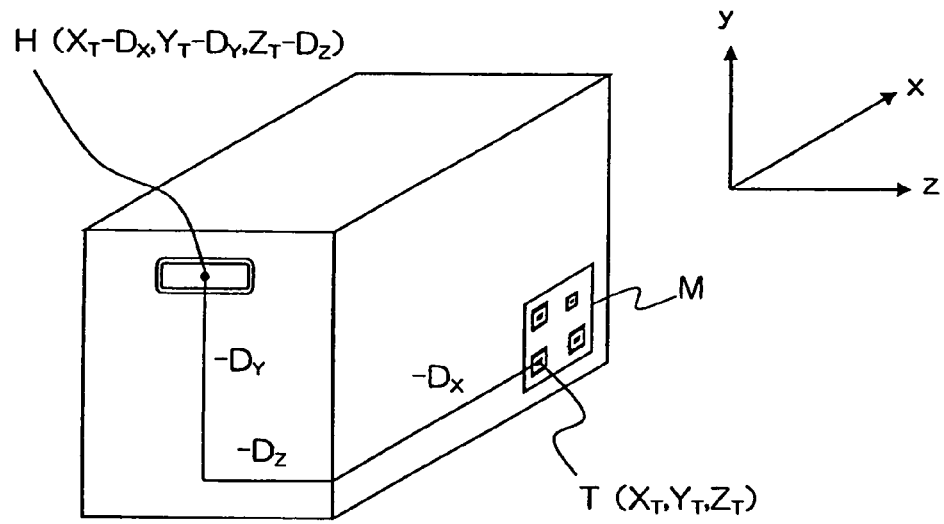
FIG. 15A is an explanatory view for explaining a method for computing an operational target position when an operational target object has not been rotated.
Figure 15B:
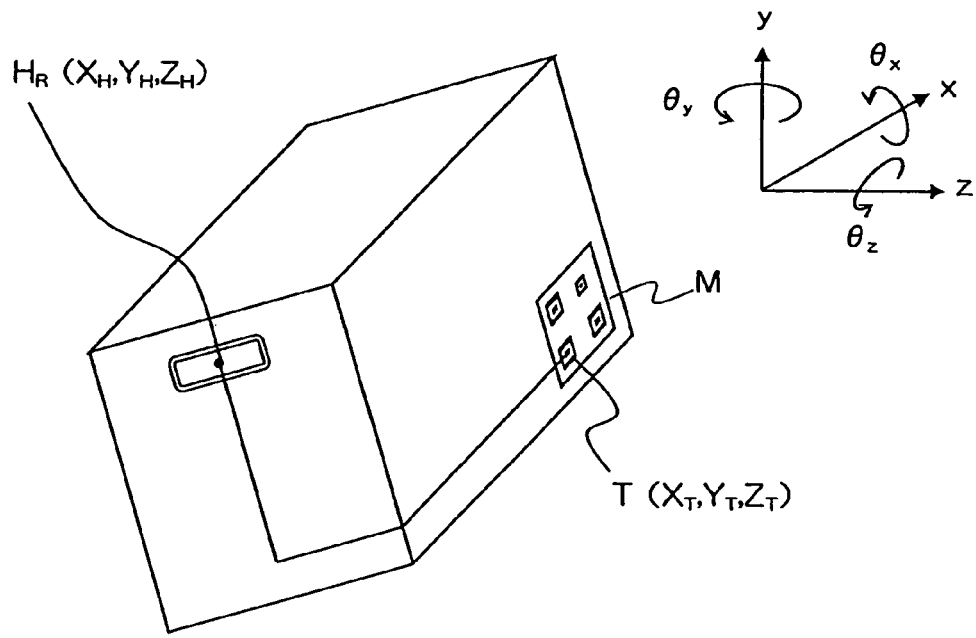
FIG. 15B is an explanatory view for explaining a method for calculating an operational target position when an operational target object has been rotated.

Here, a method for computing the operation target position will be described with reference to FIG. 15A and FIG. 15B. FIG. 15A is an explanatory view of the method for computing the operation target position when the operation target is not in the rotated condition. FIG. 15B is an explanatory view of the method for computing the operation target position when the operation target is in the rotated condition.

In the case of FIG. 15, the object (box) D with handles is adopted as the operation target object, and the 2D-code M is provided on the side surface of the box D. Here, the information about the relative position between the position detection pattern which serves as standard (standard detection pattern) and the grasping position H at which the grasping of the handle is performed is encoded to the encoded information and is recorded as the 2D-code M. Also, the relative coordinates with respect to the coordinates of the standard detection pattern of the handle is given as $(-D_x, -D_y, -D_z)$ in the coordinate system (xyz coordinate system) of the three-dimensional space.

In this case, as shown in FIG. 15A, the coordinates with respect to the coordinates T $(X_T, Y_T, Z_T)$ of the 2D-code of the grasping position H can be expressed with coordinates $(X_T-D_X, Y_T-D_Y, Z_T-D_Z)$, when the box D is not in the rotated condition.

Here, the coordinates T $(X_T, Y_T, Z_T)$ of the 2D-code is positional information computed by the position/posture-computing device 44 (FIG. 2).

Also, as shown in FIG. 15B, the coordinates $H_R$ $(X_H, Y_H, Z_H)$ of the grasping position H after rotation can be specified by the following formula (17), based on the angles $\theta_x, \theta_y$, and $\theta_z$, which are the posture information computed by the position/posture computing device 44 (FIG. 2), the coordinates T $(X_T, Y_T, Z_T)$ of the 2D-code M, and the relative coordinates $(-D_x, -D_y, -D_y)$.

$$\begin{bmatrix} X_H \\ Y_H \\ Z_H \end{bmatrix} = \begin{bmatrix} 1 & 0 & 0 \\ 0 & \cos\theta_x & \sin\theta_x \\ 0 & -\sin\theta_x & \cos\theta_x \end{bmatrix} \begin{bmatrix} \cos\theta_y & 0 & -\sin\theta_y \\ 0 & 1 & 0 \\ \sin\theta_y & 0 & \cos\theta_y \end{bmatrix} \begin{bmatrix} \cos\theta_z & \sin\theta_z & 0 \\ -\sin\theta_z & \cos\theta_z & 0 \\ 0 & 0 & 1 \end{bmatrix} \quad (17)$$

$$\begin{bmatrix} X_T - D_x \\ Y_T - D_y \\ Z_T - D_z \end{bmatrix}$$

As described above, an operation target position can be specified based on the position/posture information computed by the position/posture-computing device 44 (FIG. 2) and the decoded information (the relative position of the handle) decoded by the information pattern-decoding device 43 (FIG. 2).

In the above description, the configuration of the 2D-code detector 1 has been explained, however, the present invention is not limited hereto. Here, the area extraction device 41 has been provided for the purpose of detecting position identifying patterns with accuracy from an acquired image picked up in an arbitrary three-dimensional space, however, when the present invention is used for specifying the position of a work-piece such as a substrate, since the position identifying patterns have been roughly specified in position, the area extraction device 41 may be omitted from the configuration.

Moreover, the function of the 2D-code detector 1 may be realized by a computer which is operated based on a two-dimensional code detection program and provides the function of the 2D-code detector under the control of a two-dimensional code detection program. In this case, this program can be distributed through a communication line or can be distributed by a program recorded on a recording medium, e.g. CD-ROM etc.

[Operation of Two-dimensional Code Detector]

Figure 16:
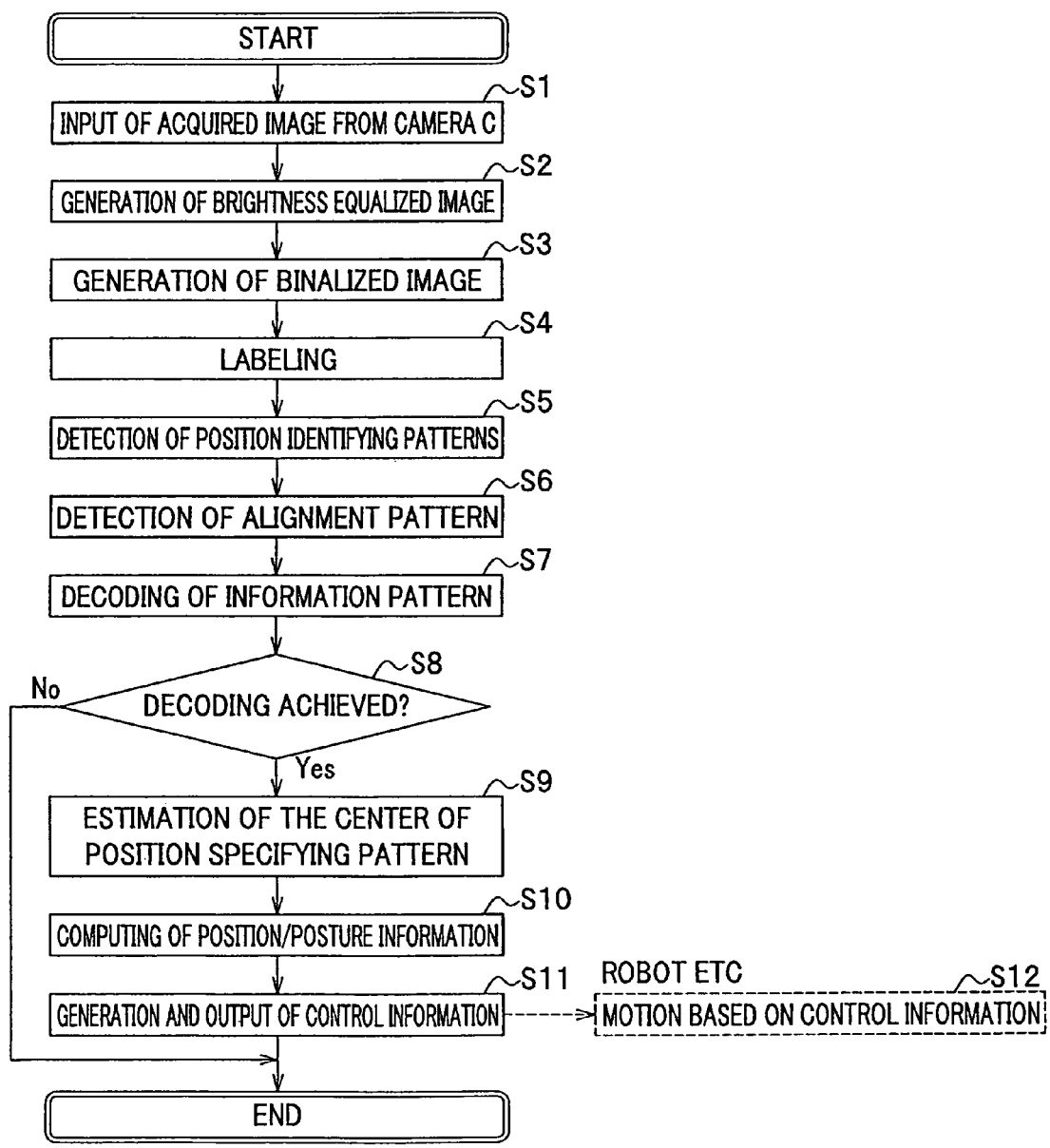
FIG. 16 is a flowchart showing operations of a two-dimensional code detector.

Next, operations of the two-dimensional code detector 1 will be explained with reference to FIG. 16 mainly and FIGS.

1 and 2 appropriately. FIG. 16 is a flowchart showing operations of a two-dimensional code detector.

First, in the 2D-code detector 1, the image input unit 2 receives an acquired image (black and white image) obtained by an image pickup of the camera C (step S1). Here, the image input unit 2 receives the acquired image obtained by the camera C in frame image unit and sequentially stores the acquired image in the recording unit 3.

Then, in the 2D-code detector 1, the brightness normalization part 41a of the area extraction device 41 of the image analyzer 4 normalizes light intensity (brightness) of the acquired image by correcting the brightness of pixels of the acquired image. Thereby, a brightness-normalized image (refer to FIG. 5) for which the 2D-code M has been equalized in the brightness level is generated by the 2D-code detector 1 (step S2).

Subsequently, in the 2D-code detector 1, the binarization part 41b of the area extraction device 41 generates a binarized image by binarizing the brightness-normalized image, which is normalized in the step S2, for each pixel, using a predetermined threshold value as a reference (step S3). Thereby, areas to be candidates for position identifying patterns of the 2D-code M are extracted.

Furthermore, in the 2D-code detector 1, the labeling part 41c of the area extraction device 41 categorizes the areas, which are generated in step S3 and are extracted as a binarized image, by labeling (labeling process: step S4). Here, the labeling part 41c generates a labeled image (see FIG. 8) by setting a pixel value of each area to a value (label) specified to the area.

Then, in the 2D-code detector 1, the position detection pattern detection part 42a of the pattern detection device 42 detects three position detection patterns, which are the components of position identifying patterns, by searching patterns each having a ratio of "1:1:3:1:1" as a "black-white-black-white-black" light-dark pattern from the acquired image (step S5).

Furthermore, in the 2D-code detector 1, the alignment pattern detection part 42b of the pattern detection device 42 computes the center of gravity positions of two areas (clusters) in an area in the vicinity of 4th vertex position which constitutes one of vertexes of the rectangle configured by the three position detection patterns which are detected in step S5. Then, the alignment pattern detection part 42b detects a pattern in which the center of the gravity positions are closest as the alignment pattern (step S6).

Furthermore, in the 2D-code detector 1, the information pattern-decoding device 43 decodes the information pattern (encoded pattern) described in the 2D-code M to obtain the decoded information (step S7). Here, the information pattern-decoding device 43 detects whether or not the decoding of the information pattern is successfully achieved (step S8). When the decoding is successfully achieved (Yes), the processing proceeds to the step S9. When the decoding is not successfully achieved (No), on the contrary, the processing is terminated.

Then, in the 2D-code detector 1, the pattern position estimation part 44a of the position/posture computing device 44 calculates the center position, with high precision not more than pixel size, of each area of the position identifying patterns (position detection patterns and alignment pattern) which are detected in step S5 and step S6 (step S9).

Subsequently, in the 2D-code detector 1, three-dimensional position/posture computing part 44b of the position/posture computing device 44 computes position/posture information indicating the position and posture in the three-dimensional space, based on four points at the center positions of the position identifying patterns (position detection patterns and alignment pattern)(step S10).

Then, in the 2D-code detector 1, the control information generator 5 generates the information (control information) relating to the operation of the controller (e.g. a robot), based on position/posture information computed in step S10 and decoded information decoded in step S7. Then, control information is outputted to the controller of a robot etc. (step S11), and terminates the processing in this control information generator 5.

The controller of a robot etc performs an operation based on control information when the controller of the robot etc receives control information from the 2D-code detector 1 (step S12).

According to the operations described above, the 2D-code detector 1 can detect the 2D-code M in a three-dimensional space and compute the position and posture in the 2D-code, i.e. the 2D-code detector 1 can compute the position and posture of the object with the 2D-code M. In this case, since encoded data included in the 2D-code M can be decoded by the 2D-code detector 1, the control information for controlling the operation target (the object with the 2D-code M) to perform various kinds of operations can be generated.

[Applications of 2D-code Detector]

Next, the application examples of the two-dimensional code detector according to the present invention will be described with reference to FIG. 17 and FIG. 18. FIGS. 17A to 17D are the explanatory view showing the conveyance of the box with 2D-code by grasping the box by a robot. FIGS. 18A and 18B are the explanatory view showing the grasping of the casing, such as casing of CDs (compact discs) etc.

APPLICATION EXAMPLE 1

First, the conveyance of the box by the robot (e.g. a bipedal walking robot) equipped with a camera and hands will be explained as example.

FIG. 17A shows the state where the box with 2D-code on the side surface is within the angle of the view of the camera C provided on the head of a robot RB and the existence of the box is recognized in the robot RB side. Here, the information about the relative position between a standard position and the handle of the box D(grip position H) and the information which commands the robot to carry the box D to a certain spot (destination) are encoded and recorded on the 2D-code M.

At this time, the robot RB can recognize, in a three-dimensional space, the position and posture of the 2D-code M on the box D from an acquired image obtained by the camera C.

Here, since the relative position from a reference position to a handle (grasping position H) of the box D has been encoded as an information pattern in the 2D-code M, the robot RB can recognize the grasping position H of the box D.

Then, as shown in FIG. 17B, the robot RB approaches the box D, changes the posture, and then grips the handles of the box D with the hand HD.

Thereafter, as shown in FIG. 17C, the robot RB moves to the destination point by bipedal walking, and releases the box D when the robot RB arrives at the destination point (see FIG. 17D).

As described above, the robot RB can recognize the position and posture of the object by detecting and analyzing the 2D-code M, and then perform the tasks for the object.

APPLICATION EXAMPLE 2

FIG. 18A shows a case that the 2D-code M is provided on the casing CS of CDs (compact discs). FIG. 18B shows the detecting and grasping of the casing CS by the robot RB.

As shown in FIG. 18, by using the 2D-code M on the casing CS, the robot RB (FIG. 18B) can recognize in which position and in which posture the case CS has been placed.

The robot RB shown in FIG. 18B has the same configuration as the robot RB of FIGS. 17A to 17D. That is, the robot RB detects the three-dimensional position of the 2D-code M in the acquired image obtained by the camera C by the 2D-code detector 1. Then, the robot RB recognizes the position, at which the grasping of the casing CS is performed, by the relative position, when the positions of two points for grasping the casing CS are encoded into 2D-code. Thus, the grasping of the casing CS by hands HD is enabled.

As has been described above, the 2D-code detector 1 functions as a robot control information generator when generating and outputting control information to a robot.

As such, the two-dimensional code detector (robot control information generator) can specify the position and posture of the 2D-code even if the position and posture of the mobile object such as a robot and a two-dimensional code changes. Furthermore, the 2D-code detector 1 can generate various types of control information based on information encoded to the two-dimensional code.

The embodiments of the present invention have been described as above. The present invention is not limited to the above embodiments, but various design changes can be made without departing from the present invention in the Claims.

What is claimed is:

1. A robot control information generator which generates control information for operating a robot equipped with a camera and a hand to grasp an object, based on a two-dimensional code on the object, wherein the two-dimensional code includes position identifying patterns and an information pattern, and the position within the two-dimensional code of each of the position identifying patterns is specified before hand, and the information pattern is generated by encoding of information, the robot control information generator comprising:
    an image receiver which receives an acquired image of the object by the camera;
    a pattern detection unit which detects position identifying patterns within the acquired image;
    a position/posture calculation unit which calculates position/posture information indicating a position and posture of the two-dimensional code in a three-dimensional space based on a two-dimensional position of the position identifying patterns detected by the pattern detection unit in the acquired image;
    a decoding device which decodes the information pattern; and
    a control information generating unit which generates the control information based on the decoded information decoded by the decoding device and the position/posture information calculated by the position/posture calculation unit, and
    a robot interface configured to output the control information to a controller of the robot.

2. A robot control information generator according to claim 1, wherein
    a relative position of a grasping position of the object with respect to the position identifying patterns of the two-dimensional code is encoded and is included in the information pattern, the grasping position is a position where the robot grasps the object, and
    the control information-generating unit includes:
    a grasping position calculation device which calculates the grasping position based on position/posture information, which is calculated by the position/posture calculation unit, and the relative position, which is obtained by the decoding by the decoding device.

3. A robot equipped with a camera and hand portions to grasp an object, comprising:
    the robot control information generator according to claim 1, wherein
    the robot is configured to grasp the object based on control information generated by the robot control information generator.

4. A robot according to claim 3, wherein
    a relative position of a grasping position of the object with respect to the position identifying patterns of the two-dimensional code is encoded and is included in the information pattern, the grasping position is a position where the robot grasps the object, and
    the control information-generating unit includes:
    a grasping position calculation device which calculates the grasping position based on position/posture information, which is calculated by the position/posture calculation unit, and the relative position, which is obtained by the decoding by the decoding device.

* * * * *